(12) United States Patent
Fairbanks et al.

(10) Patent No.: US 12,544,893 B2
(45) Date of Patent: Feb. 10, 2026

(54) FEED PISTON PRESSURE TUBE

(71) Applicant: Black & Decker Inc., New Britain, CT (US)

(72) Inventors: Jonathan W. Fairbanks, Coventry, RI (US); Jonathan D. Kalow, East Greenwich, RI (US); James Sareault, Walpole, MA (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 15/628,580

(22) Filed: Jun. 20, 2017

(65) Prior Publication Data

US 2017/0361442 A1 Dec. 21, 2017

Related U.S. Application Data

(60) Provisional application No. 62/352,541, filed on Jun. 20, 2016, provisional application No. 62/352,515, filed on Jun. 20, 2016, provisional application No. 62/352,547, filed on Jun. 20, 2016, provisional application No. 62/352,477, filed on Jun. 20, 2016.

(51) Int. Cl.
*B25C 1/04* (2006.01)
*B25C 1/00* (2006.01)
*B25C 5/16* (2006.01)

(52) U.S. Cl.
CPC .............. *B25C 1/043* (2013.01); *B25C 1/008* (2013.01); *B25C 1/041* (2013.01); *B25C 5/1665* (2013.01)

(58) Field of Classification Search
None
See application file for complete search history.

(56) References Cited

U.S. PATENT DOCUMENTS

| 618,085 | A | 1/1899 | Grandy |
| 1,727,383 | A | 9/1929 | Simonides |

(Continued)

FOREIGN PATENT DOCUMENTS

| CA | 2524765 A1 | 4/2006 |
| CN | 1846947 A | 10/2006 |

(Continued)

OTHER PUBLICATIONS

Extended European Search Report, Application No. 17161681.6-1019 / 3213872, EPO (dated Aug. 2, 2018).

(Continued)

*Primary Examiner* — Tanzim Imam
(74) *Attorney, Agent, or Firm* — Wright IP & International Law; Eric G. Wright

(57) ABSTRACT

A pneumatic fastening device which uses compressed air from an internal reservoir to momentarily move a feed piston in a direction away from a drive channel when a trigger is actuated and a fastener is driven into a workpiece. The compressed air can flow from the reservoir to a return chamber by flowing through a passageway to pressurize the return chamber and move the feed piston away from the drive channel. The passageway can be a feed piston pressure tube which received compressed air from the reservoir, passes through one or more bulkheads that separate different chambers of the pneumatic fastening device and has an outlet in the return chamber.

27 Claims, 9 Drawing Sheets

(56) References Cited

U.S. PATENT DOCUMENTS

| | | |
|---|---|---|
| 2,106,034 A | 1/1938 | Mall |
| 2,398,544 A | 4/1946 | Lockhart |
| 2,417,490 A | 3/1947 | Hewes |
| 2,519,617 A | 8/1950 | Wember |
| 2,522,931 A | 9/1950 | Curtiss |
| 2,569,221 A | 9/1951 | Batten |
| 2,580,631 A | 1/1952 | Whitledge |
| 2,630,784 A | 3/1953 | Wallerstein, Jr. |
| 2,646,729 A | 7/1953 | Godenir |
| 2,733,440 A | 2/1956 | Jenny |
| 2,768,244 A | 10/1956 | Tiger |
| 3,086,207 A | 4/1963 | Lingle et al. |
| 3,099,837 A * | 8/1963 | Heilman ............... B25C 1/041 227/136 |
| 3,180,435 A | 4/1965 | McHenry |
| 3,193,049 A | 7/1965 | Wollek |
| 3,205,721 A | 9/1965 | Speer |
| 3,205,972 A | 9/1965 | Stricker et al. |
| 3,228,422 A | 1/1966 | Bade |
| 3,302,047 A | 1/1967 | Short |
| 3,386,527 A | 6/1968 | Daubert et al. |
| 3,498,517 A * | 3/1970 | Novak ................... B25C 1/041 227/8 |
| 3,524,576 A * | 8/1970 | Bader .................... B25C 1/041 227/136 |
| 3,563,438 A * | 2/1971 | Doyle .................. B25C 5/1627 227/8 |
| 3,584,776 A | 6/1971 | Bolte |
| 3,622,062 A * | 11/1971 | Goode, Jr ............. B25C 1/003 227/136 |
| 3,653,299 A | 4/1972 | Howard |
| 3,708,095 A | 1/1973 | Briggs, Jr. |
| 3,711,008 A | 1/1973 | Clifford et al. |
| 3,713,573 A | 1/1973 | Fehrs |
| 3,812,726 A | 5/1974 | Bell |
| 3,829,722 A | 8/1974 | Rosenthal, Jr. et al. |
| 3,858,780 A * | 1/1975 | Perkins ................. B25C 1/003 227/8 |
| 3,858,781 A | 1/1975 | Obergfell et al. |
| 3,908,884 A | 9/1975 | Schrepferman |
| 4,042,036 A | 8/1977 | Smith et al. |
| 4,053,094 A | 10/1977 | Males |
| 4,107,591 A | 8/1978 | Herr et al. |
| 4,107,604 A | 8/1978 | Bernier |
| 4,121,745 A | 10/1978 | Smith et al. |
| 4,129,240 A | 12/1978 | Geist |
| 4,166,507 A | 9/1979 | Bouyoucos et al. |
| 4,189,080 A | 2/1980 | Smith et al. |
| 4,197,974 A | 4/1980 | Morton et al. |
| 4,204,622 A | 5/1980 | Smith et al. |
| 4,253,598 A | 3/1981 | Haytayan |
| 4,319,705 A * | 3/1982 | Geist .................... B25C 1/003 227/120 |
| 4,323,127 A | 4/1982 | Cunningham |
| 4,346,205 A | 8/1982 | Hiles |
| 4,404,894 A | 9/1983 | Oesterle |
| 4,423,970 A | 1/1984 | Potter |
| 4,463,888 A | 8/1984 | Geist et al. |
| 4,519,535 A | 5/1985 | Crutcher |
| 4,544,090 A | 10/1985 | Warman et al. |
| 4,558,747 A | 12/1985 | Cunningham |
| 4,562,589 A | 12/1985 | Warnaka et al. |
| 4,597,517 A | 7/1986 | Wagdy |
| 4,601,408 A | 7/1986 | Billing et al. |
| 4,624,401 A | 11/1986 | Gassner et al. |
| 4,688,710 A | 8/1987 | Massari, Jr. et al. |
| 4,784,308 A * | 11/1988 | Novak ................... B25C 1/003 227/120 |
| 4,825,596 A | 5/1989 | Kinner |
| 4,829,248 A | 5/1989 | Loubier |
| 4,832,245 A | 5/1989 | Terayama et al. |
| 4,854,492 A | 8/1989 | Houck et al. |
| 4,858,812 A | 8/1989 | Fealey |
| 4,897,914 A | 2/1990 | Loubier |
| 4,909,419 A * | 3/1990 | Yamada ................ B25C 1/045 227/1 |
| 4,928,868 A | 5/1990 | Kerrigan |
| 4,964,558 A | 10/1990 | Crutcher et al. |
| 4,966,041 A | 10/1990 | Miyazaki |
| 4,981,373 A | 1/1991 | Bando |
| 4,981,737 A | 1/1991 | Rico |
| 5,069,379 A | 12/1991 | Kerrigan |
| 5,083,694 A | 1/1992 | Lemos |
| 5,098,004 A | 3/1992 | Kerrigan |
| 5,131,579 A * | 7/1992 | Okushima ............. B25C 1/008 173/210 |
| 5,135,152 A * | 8/1992 | Uno ...................... B25C 1/045 227/116 |
| 5,197,647 A | 3/1993 | Howell |
| 5,216,823 A | 6/1993 | Ripley |
| 5,231,750 A | 8/1993 | Fealey |
| 5,263,842 A | 11/1993 | Fealey |
| 5,266,917 A | 11/1993 | Bleeke et al. |
| 5,297,713 A | 3/1994 | Perra et al. |
| 5,363,569 A | 11/1994 | Kadakia |
| 5,433,367 A | 7/1995 | Liu |
| 5,436,516 A | 7/1995 | Yamazaki et al. |
| 5,443,196 A | 8/1995 | Burlington |
| 5,493,216 A | 2/1996 | Asa |
| 5,511,715 A | 4/1996 | Crutcher et al. |
| 5,603,595 A | 2/1997 | Nygren, Jr. |
| 5,605,268 A | 2/1997 | Hayashi et al. |
| 5,624,150 A | 4/1997 | Venier |
| 5,647,525 A | 7/1997 | Ishizawa |
| 5,669,542 A | 9/1997 | White |
| 5,683,024 A * | 11/1997 | Eminger ................ B25C 1/00 227/113 |
| 5,723,923 A | 3/1998 | Clagett |
| 5,813,588 A | 9/1998 | Lin |
| 5,829,660 A | 11/1998 | White |
| 5,848,655 A | 12/1998 | Cooper et al. |
| 5,865,360 A | 2/1999 | White |
| 5,873,509 A | 2/1999 | Liao |
| 5,911,351 A | 6/1999 | White |
| 5,924,621 A | 7/1999 | Hung |
| 6,006,975 A * | 12/1999 | Ishizawa ............... B25C 1/047 227/119 |
| 6,012,622 A | 1/2000 | Weinger et al. |
| 6,036,072 A | 3/2000 | Lee |
| 6,053,389 A | 4/2000 | Chu et al. |
| 6,123,241 A | 9/2000 | Walter et al. |
| 6,131,787 A | 10/2000 | Curtis |
| 6,192,769 B1 | 2/2001 | Stark et al. |
| 6,196,332 B1 | 3/2001 | Albert et al. |
| 6,199,739 B1 | 3/2001 | Mukoyama et al. |
| 6,213,371 B1 | 4/2001 | Cabrera |
| 6,237,747 B1 | 5/2001 | Gantner et al. |
| 6,274,953 B1 | 8/2001 | Hwang et al. |
| 6,290,115 B1 | 9/2001 | Chen |
| 6,296,167 B1 | 10/2001 | Jen |
| 6,422,447 B1 | 7/2002 | White et al. |
| 6,425,306 B1 | 7/2002 | Habermehl |
| 6,431,430 B1 | 8/2002 | Jalbert et al. |
| 6,464,306 B2 | 10/2002 | Shaw et al. |
| 6,499,642 B1 | 12/2002 | Amada |
| 6,499,643 B1 | 12/2002 | Hewitt |
| 6,604,666 B1 | 8/2003 | Pedicini et al. |
| 6,641,022 B2 | 11/2003 | Hamano et al. |
| 6,679,413 B2 | 1/2004 | Miller et al. |
| 6,705,503 B1 | 3/2004 | Pedicini et al. |
| 6,739,490 B1 | 5/2004 | Shkolnikov et al. |
| 6,755,807 B2 | 6/2004 | Risk, Jr. et al. |
| 6,772,931 B2 | 8/2004 | Miller et al. |
| 6,796,475 B2 | 9/2004 | Adams |
| 6,796,476 B2 | 9/2004 | Birk et al. |
| 6,824,533 B2 | 11/2004 | Risk, Jr. et al. |
| 6,828,020 B2 | 12/2004 | Fisher et al. |
| 6,880,739 B1 | 4/2005 | Zhu |
| 6,892,921 B2 | 5/2005 | Beville |
| 6,894,595 B2 | 5/2005 | Howell |
| 6,938,812 B2 | 9/2005 | Miller et al. |
| 6,971,567 B1 | 12/2005 | Cannaliato et al. |
| 7,091,635 B1 | 8/2006 | Gilliland et al. |

(56) References Cited

U.S. PATENT DOCUMENTS

| | | |
|---|---|---|
| 7,137,541 B2 | 11/2006 | Baskar et al. |
| 7,138,595 B2 | 11/2006 | Berry et al. |
| 7,162,804 B2 | 1/2007 | Matsuura |
| 7,165,305 B2 | 1/2007 | Kenney et al. |
| 7,204,403 B2 | 4/2007 | Kenney et al. |
| 7,213,732 B2 | 5/2007 | Schell et al. |
| 7,213,733 B1 | 5/2007 | Wen |
| 7,225,961 B1 | 6/2007 | Lee |
| 7,243,831 B2 | 7/2007 | Ishizawa et al. |
| 7,285,877 B2 | 10/2007 | Gorti et al. |
| 7,314,155 B2 | 1/2008 | Moeller et al. |
| 7,322,506 B2 | 1/2008 | Forster |
| 7,325,712 B2 | 2/2008 | Schiestl |
| 7,331,403 B2 | 2/2008 | Berry et al. |
| 7,410,085 B2 | 8/2008 | Wolf et al. |
| 7,500,589 B2 | 3/2009 | Wolf et al. |
| 7,503,401 B2 | 3/2009 | Gross et al. |
| 7,513,404 B2 | 4/2009 | Shkolnikov et al. |
| 7,520,414 B2 | 4/2009 | Blessing et al. |
| 7,532,096 B2 | 5/2009 | Zindler |
| 7,537,146 B2 | 5/2009 | Schiestl |
| 7,575,142 B2 | 8/2009 | Liang et al. |
| 7,594,547 B2 | 9/2009 | Berry et al. |
| 7,619,499 B2 | 11/2009 | Wieler et al. |
| 7,641,089 B2 | 1/2010 | Schell et al. |
| 7,686,199 B2 | 3/2010 | Gross et al. |
| 7,694,863 B2 | 4/2010 | Spasov et al. |
| 7,699,201 B2 * | 4/2010 | Hagan .................. B25C 1/003 227/135 |
| 7,726,536 B2 | 6/2010 | Gross et al. |
| 7,762,443 B2 * | 7/2010 | Tamura ................ B25C 5/1627 227/120 |
| 7,766,204 B2 | 8/2010 | Spasov et al. |
| 7,777,482 B2 | 8/2010 | Munz et al. |
| 7,789,169 B2 | 9/2010 | Berry et al. |
| 7,793,811 B1 | 9/2010 | Pedicini et al. |
| 7,810,688 B2 | 10/2010 | Wu et al. |
| 7,861,905 B2 | 1/2011 | Miescher et al. |
| 7,870,988 B2 | 1/2011 | Schiestl et al. |
| 7,922,059 B2 | 4/2011 | Schiestl et al. |
| 7,942,651 B2 | 5/2011 | Bin-Nun et al. |
| 7,975,893 B2 | 7/2011 | Berry et al. |
| 7,980,439 B2 | 7/2011 | Akiba et al. |
| 7,997,467 B2 | 8/2011 | Hirabayashi et al. |
| 8,011,549 B2 | 9/2011 | Berry et al. |
| 8,047,415 B2 | 11/2011 | Kunz et al. |
| 8,079,504 B1 | 12/2011 | Pedicini et al. |
| 8,088,406 B2 | 1/2012 | Potter et al. |
| 8,096,456 B2 | 1/2012 | Kunz et al. |
| 8,123,099 B2 | 2/2012 | Kenney et al. |
| 8,132,702 B2 | 3/2012 | Kunz et al. |
| 8,210,409 B2 | 7/2012 | Hirabayashi |
| 8,231,039 B2 | 7/2012 | Buck et al. |
| 8,302,833 B2 | 11/2012 | Gross et al. |
| 8,336,748 B2 | 12/2012 | Hlinka et al. |
| RE44,001 E | 2/2013 | Pedicini et al. |
| 8,381,960 B2 | 2/2013 | Bruggmueller et al. |
| 8,397,967 B2 | 3/2013 | Calvet et al. |
| 8,485,407 B2 * | 7/2013 | Liu ........................ B25C 1/184 227/138 |
| 8,523,035 B2 | 9/2013 | Pedicini et al. |
| 8,534,527 B2 | 9/2013 | Brendel et al. |
| 8,550,324 B2 | 10/2013 | Coleman |
| 8,555,997 B2 | 10/2013 | Carrier et al. |
| 8,602,283 B2 * | 12/2013 | Tamura ................... B25C 1/184 227/8 |
| 8,746,526 B2 | 6/2014 | Hlinka et al. |
| 8,763,874 B2 | 7/2014 | McCardle et al. |
| 9,065,305 B2 | 6/2015 | Trinkner |
| 9,248,539 B2 | 2/2016 | Tajima |
| 9,346,158 B2 | 5/2016 | Garber et al. |
| 9,469,021 B2 | 10/2016 | Gregory et al. |
| 9,473,053 B2 | 10/2016 | Lim et al. |
| 9,498,871 B2 | 11/2016 | Gregory et al. |
| 9,566,692 B2 | 2/2017 | Seith et al. |
| 9,643,305 B2 | 5/2017 | Gregory et al. |
| 9,649,755 B2 | 5/2017 | Gregory et al. |
| 9,808,924 B2 | 11/2017 | Wu |
| 9,815,160 B2 | 11/2017 | Nitsche et al. |
| 9,827,658 B2 | 11/2017 | Gregory et al. |
| 10,022,848 B2 | 7/2018 | Gross et al. |
| 10,406,662 B2 | 9/2019 | Leh et al. |
| 10,414,033 B2 | 9/2019 | Ekstrom et al. |
| 10,434,634 B2 | 10/2019 | Garber |
| 10,882,166 B2 | 1/2021 | Asplund |
| 10,888,981 B2 | 1/2021 | Gregory et al. |
| 11,179,836 B2 | 11/2021 | Gregory et al. |
| 11,229,995 B2 | 1/2022 | Gegory et al. |
| 12,151,348 B2 | 11/2024 | Gregory et al. |
| 12,208,497 B2 | 1/2025 | Gregory et al. |
| 2002/0007559 A1 | 1/2002 | Morabit et al. |
| 2002/0053587 A1 | 5/2002 | White et al. |
| 2002/0060233 A1 | 5/2002 | Akiba |
| 2002/0117893 A1 | 8/2002 | Shaw et al. |
| 2002/0158103 A1 | 10/2002 | Driscoll et al. |
| 2003/0000990 A1 | 1/2003 | White et al. |
| 2003/0030682 A1 | 2/2003 | Kim et al. |
| 2003/0042285 A1 | 3/2003 | Wang |
| 2003/0066858 A1 | 4/2003 | Holgersson |
| 2003/0230621 A1 | 12/2003 | Yamamoto et al. |
| 2003/0230622 A1 | 12/2003 | Rotharmel |
| 2004/0189284 A1 | 9/2004 | Haubold et al. |
| 2004/0219322 A1 | 11/2004 | Fisher et al. |
| 2004/0232194 A1 | 11/2004 | Pedicini et al. |
| 2005/0000998 A1 | 1/2005 | Grazioli et al. |
| 2005/0029391 A1 | 2/2005 | Cocciadiferro et al. |
| 2005/0050712 A1 | 3/2005 | Lat et al. |
| 2005/0217874 A1 | 10/2005 | Forster et al. |
| 2005/0217875 A1 | 10/2005 | Forster et al. |
| 2005/0218175 A1 | 10/2005 | Schell et al. |
| 2005/0218176 A1 | 10/2005 | Schell et al. |
| 2005/0218183 A1 | 10/2005 | Berry et al. |
| 2005/0218186 A1 | 10/2005 | Forster |
| 2005/0220445 A1 | 10/2005 | Baskar et al. |
| 2005/0289264 A1 | 12/2005 | Illowsky et al. |
| 2006/0000863 A1 | 1/2006 | McGee et al. |
| 2006/0011694 A1 | 1/2006 | Ishizawa et al. |
| 2006/0016843 A1 | 1/2006 | Ishizawa et al. |
| 2006/0078438 A1 | 4/2006 | Wood |
| 2006/0091179 A1 | 5/2006 | Moeller et al. |
| 2006/0155582 A1 | 7/2006 | Brown |
| 2006/0161111 A1 | 7/2006 | Potter et al. |
| 2006/0169738 A1 | 8/2006 | Ogawa et al. |
| 2006/0243020 A1 | 11/2006 | Herod |
| 2006/0249554 A1 | 11/2006 | Butzen et al. |
| 2006/0261125 A1 | 11/2006 | Schiestl |
| 2007/0037102 A1 | 2/2007 | Mowry |
| 2007/0075112 A1 | 4/2007 | Porth et al. |
| 2007/0108029 A1 | 5/2007 | Wieler et al. |
| 2007/0210133 A1 | 9/2007 | Oda et al. |
| 2008/0006670 A1 * | 1/2008 | Wen ...................... B25C 1/045 227/130 |
| 2008/0099526 A1 | 5/2008 | Brendel et al. |
| 2008/0112056 A1 | 5/2008 | Raymond et al. |
| 2008/0223900 A1 * | 9/2008 | Tanji .................... B25C 5/1627 227/130 |
| 2008/0251567 A1 | 10/2008 | Shkolnikov et al. |
| 2008/0302846 A1 | 12/2008 | Thompson |
| 2008/0308597 A1 | 12/2008 | Wojcicki |
| 2009/0025701 A1 | 1/2009 | Douglas et al. |
| 2009/0030442 A1 | 1/2009 | Potter et al. |
| 2009/0032567 A1 | 2/2009 | Liang et al. |
| 2009/0050667 A1 | 2/2009 | Po |
| 2009/0057365 A1 * | 3/2009 | Murayama ................ B25C 1/08 227/130 |
| 2009/0057366 A1 | 3/2009 | Braddock |
| 2009/0095787 A1 | 4/2009 | Liang et al. |
| 2009/0183888 A1 | 7/2009 | Forster et al. |
| 2009/0194573 A1 | 8/2009 | Liang et al. |
| 2009/0200354 A1 | 8/2009 | Arata et al. |
| 2009/0250500 A1 | 10/2009 | Brendel et al. |
| 2009/0275273 A1 | 11/2009 | Purohit et al. |
| 2009/0294505 A1 | 12/2009 | Kunz et al. |
| 2009/0294508 A1 | 12/2009 | Kunz et al. |

(56) References Cited

U.S. PATENT DOCUMENTS

| | | |
|---|---|---|
| 2009/0321098 A1 | 12/2009 | Hull et al. |
| 2009/0321492 A1 | 12/2009 | Shima et al. |
| 2010/0095645 A1 | 4/2010 | Tippery et al. |
| 2010/0206934 A1 | 8/2010 | Vallon et al. |
| 2010/0213232 A1 | 8/2010 | Krondorfer et al. |
| 2010/0213236 A1 | 8/2010 | Zhang et al. |
| 2010/0289484 A1 | 11/2010 | Quinn |
| 2011/0062207 A1 | 3/2011 | Hlinka et al. |
| 2011/0132959 A1 | 6/2011 | Hlinka et al. |
| 2011/0139478 A1 | 6/2011 | Brennenstuhl et al. |
| 2011/0180284 A1 | 7/2011 | Carrier et al. |
| 2011/0248062 A1 | 10/2011 | Fujimoto |
| 2011/0259938 A1 | 10/2011 | Chien et al. |
| 2012/0001505 A1 | 1/2012 | Henke et al. |
| 2012/0097729 A1 | 4/2012 | Gross et al. |
| 2012/0124988 A1 | 5/2012 | Nelson et al. |
| 2012/0184192 A1 | 7/2012 | Kawamata et al. |
| 2012/0187178 A1 | 7/2012 | Campbell |
| 2012/0255749 A1 | 10/2012 | Seith et al. |
| 2013/0021346 A1 | 1/2013 | Terman |
| 2013/0030436 A1 | 1/2013 | LeCronier et al. |
| 2013/0052594 A1 | 2/2013 | Carroll-Yacoby et al. |
| 2013/0186221 A1 | 7/2013 | Weiberle et al. |
| 2013/0192432 A1 | 8/2013 | Barker |
| 2013/0233903 A1 | 9/2013 | Brendel et al. |
| 2013/0320059 A1 | 12/2013 | Gregory et al. |
| 2013/0320060 A1 | 12/2013 | Gregory et al. |
| 2013/0320063 A1 | 12/2013 | Gregory et al. |
| 2013/0320064 A1 | 12/2013 | Gregory et al. |
| 2013/0320066 A1 | 12/2013 | Gregory et al. |
| 2013/0320067 A1 | 12/2013 | Gregory et al. |
| 2013/0320068 A1 | 12/2013 | Gregory et al. |
| 2014/0054350 A1 | 2/2014 | Pedicini |
| 2014/0076952 A1 | 3/2014 | Garber et al. |
| 2014/0100687 A1 | 4/2014 | Ekstrom et al. |
| 2014/0161412 A1 | 6/2014 | Chase et al. |
| 2014/0263424 A1 | 9/2014 | Fortuna |
| 2014/0360744 A1 | 12/2014 | Lawrence |
| 2015/0053736 A1* | 2/2015 | Pomeroy .............. B25C 1/041 227/142 |
| 2015/0096776 A1 | 4/2015 | Garber |
| 2015/0251240 A1 | 9/2015 | LeMieux |
| 2015/0357061 A1 | 12/2015 | Ales et al. |
| 2016/0023341 A1 | 1/2016 | Gross et al. |
| 2016/0023342 A1 | 1/2016 | Koenig et al. |
| 2017/0028537 A1 | 2/2017 | McClung et al. |
| 2017/0066116 A1 | 3/2017 | Garber et al. |
| 2017/0113334 A1 | 4/2017 | Seith et al. |
| 2017/0247060 A1 | 8/2017 | Jarvis et al. |
| 2017/0361443 A1 | 12/2017 | Sareault et al. |
| 2018/0054102 A1 | 2/2018 | Mizukami et al. |
| 2018/0071904 A1 | 3/2018 | Gregory et al. |
| 2018/0085904 A1 | 3/2018 | Gregory et al. |
| 2018/0126529 A1 | 5/2018 | Pomeroy et al. |
| 2018/0222310 A1 | 8/2018 | Berlinger, Jr. et al. |
| 2018/0361560 A1 | 12/2018 | Chen et al. |
| 2019/0366527 A1 | 12/2019 | Akiba |
| 2020/0039037 A1 | 2/2020 | McClung et al. |
| 2020/0039044 A1 | 2/2020 | Akiba |
| 2020/0114501 A1 | 4/2020 | Mashiko et al. |
| 2020/0306942 A1 | 10/2020 | Koenig et al. |
| 2021/0107125 A1 | 4/2021 | Gregory et al. |
| 2021/0109134 A1 | 4/2021 | Suzuki |
| 2021/0222684 A1 | 7/2021 | Zhu et al. |
| 2021/0354278 A1 | 11/2021 | Lai et al. |
| 2022/0080571 A1 | 3/2022 | Gregory et al. |
| 2022/0118593 A1 | 4/2022 | Gregory et al. |
| 2022/0173633 A1 | 6/2022 | Heizmann et al. |
| 2024/0100669 A1 | 3/2024 | Gregory et al. |
| 2025/0050481 A1 | 2/2025 | Gregory et al. |

FOREIGN PATENT DOCUMENTS

| | | | |
|---|---|---|---|
| CN | 101032813 A | 9/2007 | |
| CN | 102900806 A | 1/2013 | |
| EP | 0230050 A1 | 7/1987 | |
| EP | 0387211 A2 | 9/1990 | |
| EP | 0663269 A1 | 7/1995 | |
| EP | 0927605 A2 | 7/1999 | |
| EP | 2002935 A2 | 12/2008 | |
| EP | 2127818 A1 | 12/2009 | |
| EP | 2127819 A1 | 12/2009 | |
| EP | 2230050 A1 | 9/2010 | |
| EP | 2527095 A1 | 11/2012 | |
| EP | 2711135 A2 | 3/2014 | |
| EP | 2979821 A1 | 2/2016 | |
| EP | 3181294 A1 | 10/2016 | |
| GB | 1438264 A * | 6/1976 | ............ B25C 1/003 |
| JP | S6135247 U | 3/1986 | |
| JP | 4101078 A | 4/1992 | |
| JP | H04331848 A | 11/1992 | |
| JP | 2007167986 A * | 7/2007 | ............ B25C 1/003 |
| JP | 5620772 B2 * | 11/2014 | ............... B25C 1/04 |
| WO | 2004052595 A1 | 6/2004 | |
| WO | 2007126735 A2 | 11/2007 | |

OTHER PUBLICATIONS

Extended European Search Report, Application No. 17161682.4-1019 / 3213873, EPO (dated Jul. 13, 2018).
Extended European Search Report, Application No. 13170116.1-1019 / 2669058, EPO (dated Mar. 20, 2018).
Extended European Search Report, Application No. 13170109.6-1701 / 2669055, EPO (dated Jun. 2, 2016).
Extended European Search Report, Application No. 13170119.5-1701 / 2669059, EPO (dated Apr. 29, 2016).
Extended European Search Report, Application No. 14187710.0-1701, EPO (dated Oct. 15, 2015).
Communication Pursuant to Article 94(3) EPC, Application No. 13 170 106.2-1019, EPO (dated Mar. 26, 2019).
Communication Pursuant to Article 94(3) EPC, Application No. 13 170 108.8-1019, EPO (dated Mar. 13, 2019).
Communication Pursuant to Article 94(3) EPC, Application No. 16 194 343.6-1019, EPO (dated Aug. 29, 2018).
Extended European Search Report, Application No. 13 170 097.3-1019 / 2716408, EPO (dated Mar. 15, 2018).
Extended European Search Report, Application No. 16 194 343.6-1701 / 3181294, EPO (dated May 24, 2017).
Extended European Search Report, Application No. 15 178 620.9-1701, EPO (dated Dec. 1, 2015).
PCT International Search Report, Application No. PCT/CN2015/076257, ISA (dated Jun. 29, 2015).
Extended European Search Report, Application No. 15827030.6-1019 / 3174667, EPO (Mar. 2, 2018).
Extended European Search Report, Application No. 13170108.8-1701 / 2669054, EPO (Jun. 22, 2016).
Extended European Search Report, Application No. 13170106.2-1701 / 2669053, EPO (May 20, 2016).
Communication Pursuant To Article 94(3) EPC, EP Application No. 13 170 113.8-1019, EPO (Oct. 25, 2018).
Communication Pursuant To Article 94(3) EPC, EP Application No. 13 170 109.6-1019, EPO (Oct. 25, 2018).

* cited by examiner

FEED PISTON PRESSURE TUBE

CROSS-REFERENCE TO RELATED APPLICATIONS

This patent application is a non-provisional application of and claims the benefit of the filing date of each of the following: U.S. provisional patent application No. 62/352,477 entitled "Connecting Tube" filed Jun. 20, 2016; U.S. provisional patent application No. 62/352,515 entitled "Cylindrical Combination Trigger/Head Valve" filed Jun. 20, 2016; U.S. provisional patent application No. 62/352,541 entitled "Depth Of Drive Mechanism" filed Jun. 20, 2016; and U.S. provisional patent application No. 62/352,547 entitled "Driver Blade" filed Jun. 20, 2016.

INCORPORATION BY REFERENCE

This patent application incorporates by reference in its entirety each of the following: U.S. provisional patent application No. 62/352,477 entitled "Connecting Tube" filed Jun. 20, 2016; U.S. provisional patent application No. 62/352,515 entitled "Cylindrical Combination Trigger/Head Valve" filed Jun. 20, 2016; U.S. provisional patent application No. 62/352,541 entitled "Depth Of Drive Mechanism" filed Jun. 20, 2016; U.S. provisional patent application No. 62/352,547 entitled "Driver Blade" filed Jun. 20, 2016; and U.S. patent application Ser. No. 15/627,450 entitled "Cylindrical Integrated Valve Assembly" filed Jun. 20, 2017.

FIELD OF THE INVENTION

The present invention generally relates to the field of pneumatic tools, and particularly to pneumatic fastening tools, such as pneumatic nailers and pneumatic staplers.

BACKGROUND OF THE INVENTION

Pneumatic fastening tools can have fastener drive systems which jam, are unreliable and have difficulty feeding fasteners to be driven into a workpiece. There is strong need for a pneumatic fastening tool with an improved and more reliable fastener feed and driving system.

SUMMARY OF THE INVENTION

In an embodiment, a pneumatic fastening device can have a chamber that provides a compressed air to a drive piston to drive a fastener, a feed piston which can feed a fastener into a drive channel; and a feed piston return chamber configured to receive a portion of the compressed air to move the feed piston in a direction away from the drive channel. The pneumatic fastening device can have a feed pawl that moves in concert with a movement of the feed piston. In an embodiment, the fastener can be a nail, or a staple, or other fastener.

In an embodiment, the pneumatic fastening device can have a means by which the compressed air can be fed to the feed piston return chamber. In non-limiting example, the means by which the compressed air can be fed to the feed piston return chamber can be a passageway, pipe, channel, opening, conduit or a feed piston pressure tube. The means by which the compressed air can be fed to the feed piston return chamber can be configured to transport pressurized the compressed air through at least one bulkhead member to a feed piston return chamber.

In an embodiment, a pneumatic fastening device can have a drive piston having a driver blade to drive a fastener into a workpiece, a nosepiece having a drive channel and a pressure reservoir chamber that provides a compressed air to the drive piston to drive the fastener. A feed piston can feed one or more fastener toward the drive channel when the drive piston is in a resting state. A feed piston return chamber can be configured to receive a portion of the compressed air to move the feed piston in a direction away from the drive channel.

In an embodiment, a pneumatic fastening device can have a pressure reservoir chamber configured to contain a compressed air and a feed piston return chamber that receives a portion of the compressed air. A plenum chamber can be separated from a feed piston return chamber. A feed piston pressure tube can be configured to pass through the plenum chamber and provide a compressed air from the pressure reservoir chamber to the feed piston return chamber. Optionally, an orifice having an orifice inlet and an orifice outlet that can have the compressed air fed to the orifice inlet, the compressed air can pass through the orifice and exit the orifice outlet to then be fed to the feed piston pressure tube. Optionally, the orifice can be an orifice bead having an orifice bead inlet, an orifice bead channel and an orifice bead outlet that can have the compressed air fed to the orifice bead inlet, the compressed air can pass through the orifice bead channel and exit the orifice bead outlet to then be fed to the feed piston pressure tube.

In an embodiment, the feed piston pressure tube can be configured to connect a feed inlet receiving the compressed air from the pressure reservoir chamber to a nose port through which the compressed air is fed to the feed piston return chamber. Optionally, the compressed air fed from the reservoir chamber has a pressure in a range of 70 psig to 500 psig.

In an embodiment, the pneumatic fastening device can have at least one bulkhead configured between the pressure reservoir chamber and the feed piston and the feed piston pressure tube can pass though the at least one bulkhead. For example, the pneumatic fastening device can have and over-piston chamber which has a reservoir bulkhead through which the feed piston pressure tube passes. In another example, For example, the pneumatic fastening device can have a plenum chamber that has a plenum bulkhead through which the feed piston pressure tube passes. In an embodiment, an over-piston chamber can be configured to provide the compressed air to the feed piston pressure tube.

In yet another example, the pneumatic fastening device can have a reservoir bulkhead configured between the over-piston chamber and the pressure reservoir chamber and a plenum bulkhead configured between the pressure reservoir chamber and the plenum chamber, in which the feed piston pressure tube can pass though the reservoir bulkhead and through the plenum bulkhead.

In an embodiment, the pneumatic fastening device can also have a feed piston, a feed pawl and a feed piston return chamber configured between the feed piston and the feed pawl and/or feed pawl head. The feed pawl can be configured to contact one or more of a fastener when in a resting state and a feed piston which controls the movement of the feed pawl. The feed piston pressure tube can be configured to provide a compressed air to the feed piston return chamber. In an embodiment, the In an embodiment, the pneumatic fastening device can have a feed piston return chamber that has a nose port and the feed piston pressure tube can be configured to provide the compressed air through a feed tube opening and into the feed piston return chamber through the nose port. The feed piston return chamber can have a nose port that is disposed between the pressure reservoir chamber and the feed piston. The feed piston pressure tube can be configured to provide the compressed air through a feed tube opening and into the feed piston return chamber through the nose port. A feed tube opening of the feed piston pressure tube can receives compressed air and can feed the compressed air to a feed piston through the nose port. The nose port is disposed between the feed piston and the feed pawl. The feed pawl can be configured to contact one or more of a fastener when in a resting state. The feed piston can be configured to drive the pawl which pushes one or more of a fastener.

In an embodiment, the pneumatic fastening device can have a feed tube opening, a feed piston biased by a feed spring, a nose port and a pawl configured to push one or more of a fastener. The nose port can be configured between the feed piston and the pawl, and the feed piston pressure tube can connect the feed tube opening and the nose port.

In an embodiment, a compressed air distribution system for a pneumatic fastener can have a source of a compressed air which can be used to drive a driver of a fastener and also to move the feed piston away from a feed piston nose stop when a trigger is actuated to drive a fastener.

In an embodiment, a method for feed piston control, can have the steps of: providing a fastening device having an over-piston chamber, a pressure reservoir chamber and a plenum chamber; providing an reservoir bulkhead configured between the over-piston chamber and the pressure reservoir chamber; providing a plenum bulkhead configured between the pressure reservoir chamber and the plenum chamber; and providing a feed piston pressure tube which passes through each of the reservoir bulkhead and the plenum bulkhead to connect a feed tube opening and a feed piston return air inlet of the feed piston return chamber through which compressed air can be fed. The method can further have the steps of providing a feed tube opening feeding a compressed air from the pressure reservoir chamber; providing a feed piston and a feed pawl; providing a feed piston return chamber configured between the feed piston and the feed pawl; and selectively feeding the compressed air from the pressure reservoir chamber to the feed tube opening through the feed piston pressure tube and through the feed piston return air inlet into the feed piston return chamber.

In an embodiment, the method for feed piston control according can also have the steps of opening the head valve; flowing compressed air to the driver assembly and simultaneously flowing of the compressed air into the chamber created by the nose and feed piston; raising the pressure of the chamber created by the nose and feed piston; and driving the feed piston away from the drive channel.

BRIEF DESCRIPTION OF THE DRAWINGS

The present technology in its several aspects and embodiments solves the problems discussed above and significantly advances the technology of pneumatic fastening tools. The present technology can become more fully understood from the detailed description and the accompanying drawings, wherein.

Herein, like reference numbers in one figure refer to like reference numbers in another figure.

DETAILED DESCRIPTION OF THE INVENTION

This disclosure relates to the many and varied embodiments of a pneumatic fastening tool technology which can be in non-limiting example a nailer, a stapler, a riveter or other device. The technology described herein can be used for a variety of pneumatic fastening tools and/or devices such as, but not limited to, nailers, roofing nailers, coil roofing nailer, finishing nailers, staplers, industrial staplers, or fine wire staplers. In an embodiment the pneumatic fastening tool 1 can drive fasteners such as, but not limited to, nails having a length in a range of from 0.25 inch to 2.0 inch or longer, such as 0.75 inch, 1 inch, 1.75 nails, or longer nails.

Figure 1:
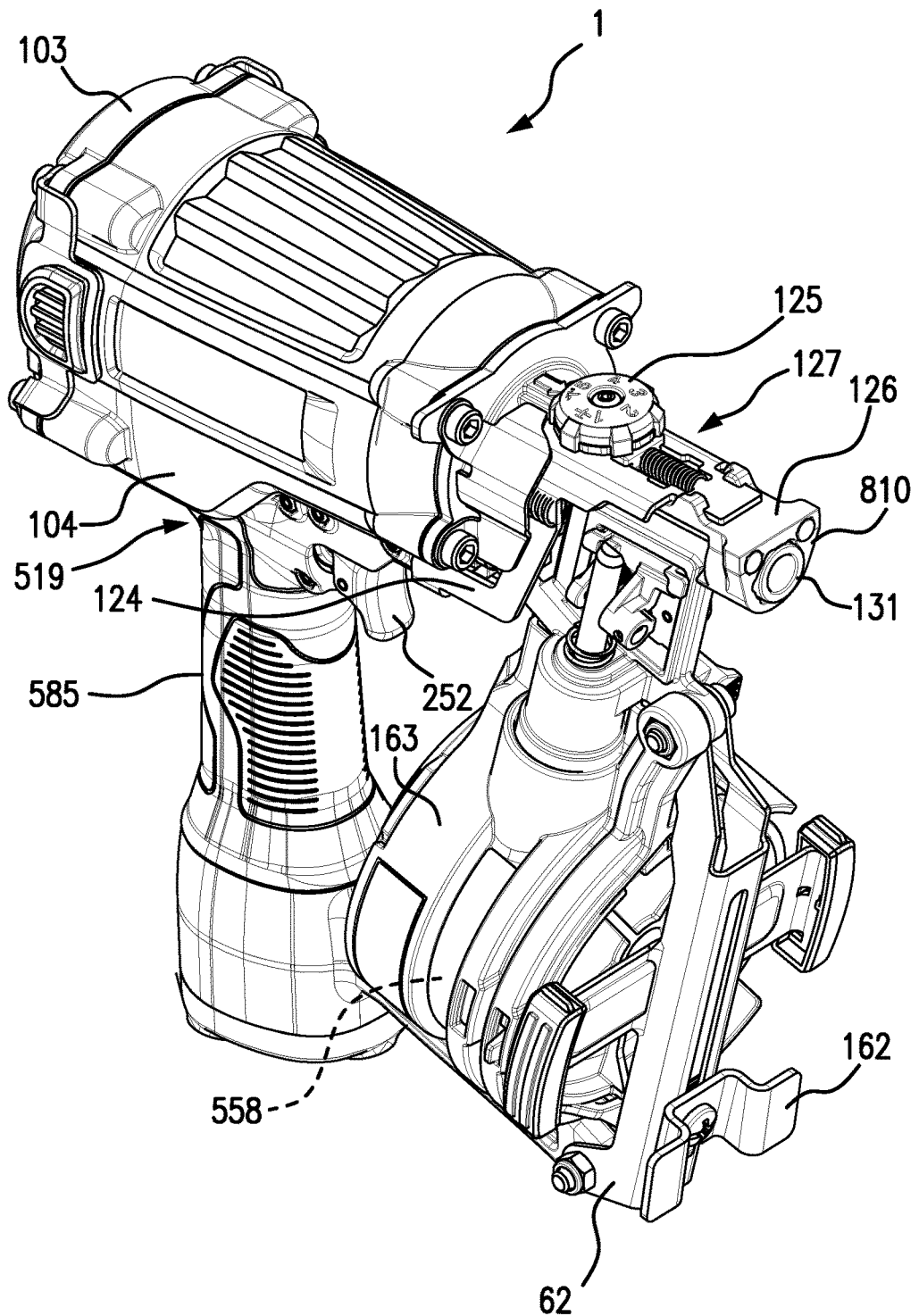
FIG. 1 is a perspective view of a pneumatic fastening tool showing the trigger mechanism.

FIG. 1 illustrates a pneumatic fastening tool 1 according to one embodiment of the present invention. The pneumatic fastening tool 1 includes a housing 104 that is preferably constructed from a lightweight, yet durable material, such as magnesium, aluminum, or other suitable material. The drive mechanism for driving a fastener is received within the housing 104 of the pneumatic fastening tool 1. The housing 104 can have one or more ports for a compressed air feed and one or more exhaust ports to purge exhaust air.

As illustrated, the pneumatic fastening tool 1 includes a handle 585 that can extend substantially perpendicularly from the housing 104. The handle 585 is configured to be grasped by a user's hand, thereby making the pneumatic fastening tool 1 portable. A trigger valve assembly 200 having a trigger 252 is provided for actuating a drive assembly 198 within the housing 104. The pneumatic fastening tool 1 can further have a nosepiece 131 connected to the housing 104. A contact trip assembly can be provided to minimize the risk of injury to the user using the pneumatic fastening tool 1. The handle 585 can have a handle top end 519 to which the housing 104 can be coupled.

The drive assembly 198 can have a driver cylinder 119 at least in part containing a drive piston 109. The drive piston 109 can have a driver blade 199 which can engage the head of a fastener to be driven 556 using the energy provided by the drive assembly 198 within the housing 104. In this regard, the nosepiece 131 receives consecutively fed fasteners from a feed canister 163.

Figure 3:
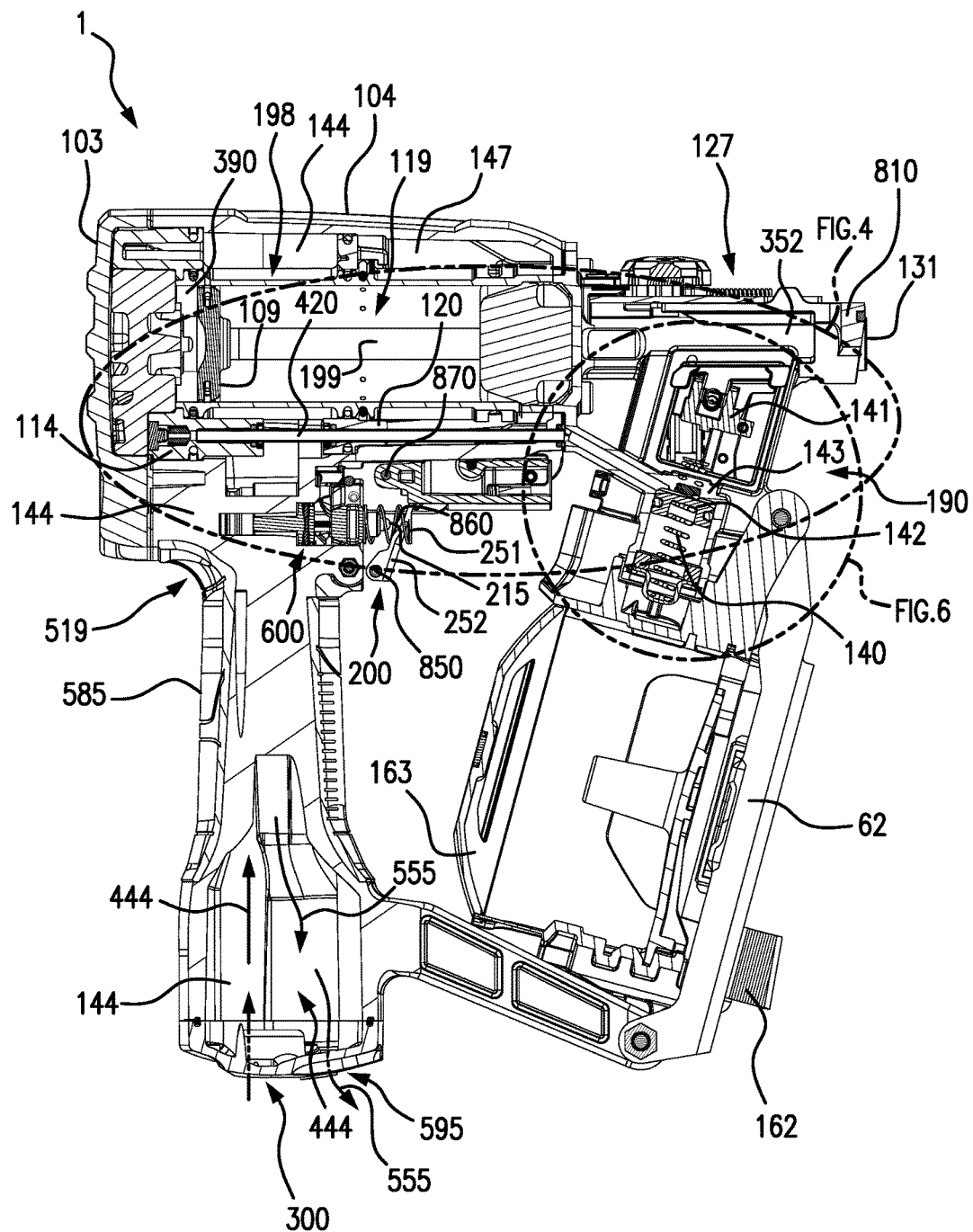
FIG. 3 is a sectional view of the pneumatic fastening tool.

FIG. 3 is a sectional view of the pneumatic fastening tool 1 in accordance with an embodiment of the present invention. As can be seen, the nosepiece 131 can have a drive channel 352 into which a fastener to be driven 556 is fed from the feed canister 163. The fastener to be driven 556 that is received in the drive channel 352 can be engaged by the driver blade 199 that engages the head of the fastener to be driven 556, and drives the fastener to be driven 556 into a workpiece using the force provided by the drive assembly 198.

The feed canister 163 can contain a coil of fasteners 558 which can be fed to the drive channel 352. Optionally, a canister spine 62 can have a shingle guide 162 can be used facilitate an operator's ease of aligning the pneumatic fastener 1 to properly fasten a shingle to a surface.

Figure 2:
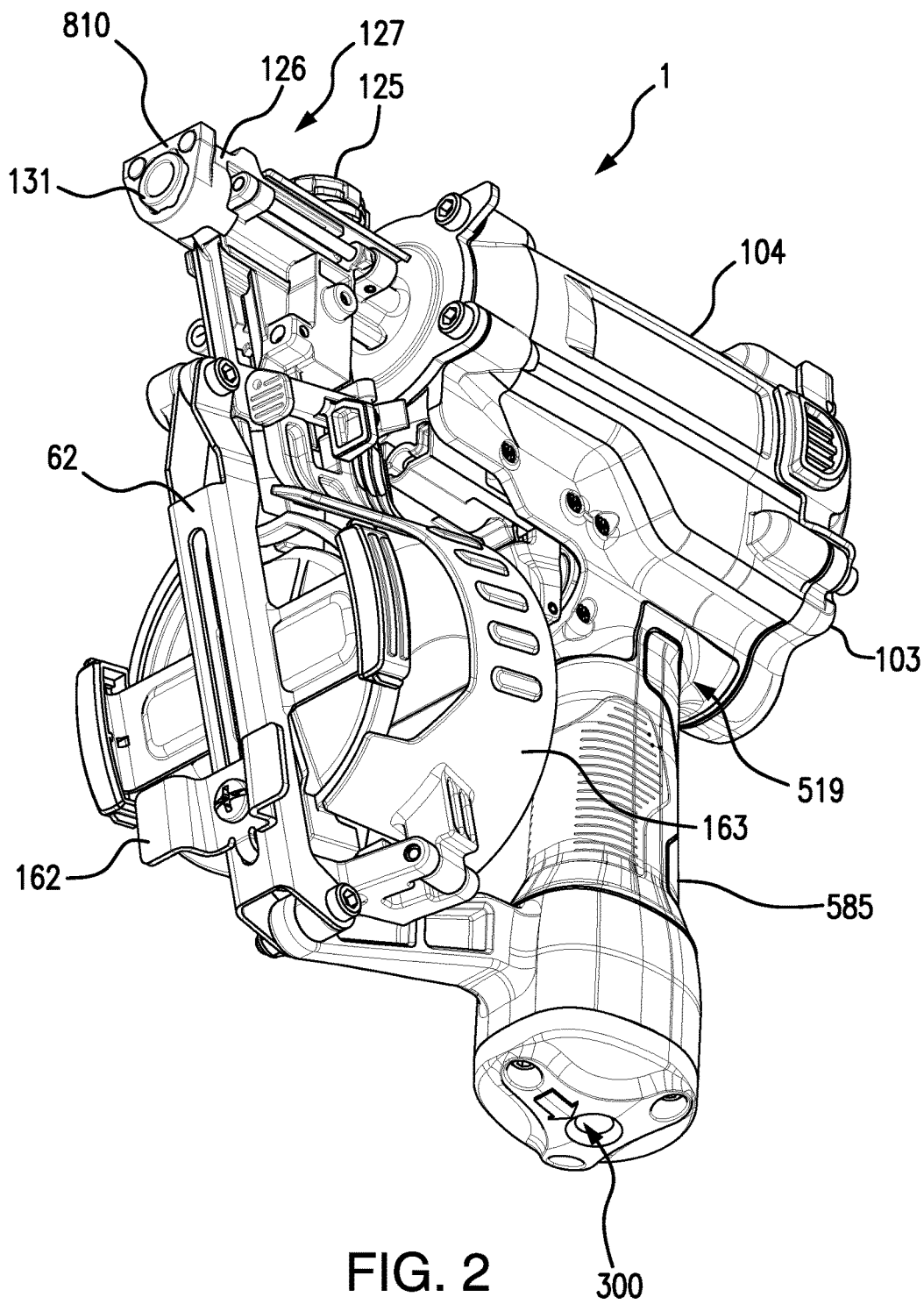
FIG. 2 is a perspective view of the pneumatic fastening tool showing the compressed air connector.

The contact trip assembly can have a lower contact arm 126 that is connected to the nosepiece 131, as shown in FIG. 1, and an upper contact arm 124 that is operatively connected to the lower contact arm 126. As shown in FIGS. 1 and 2, the lower contact arm 126 can be integrated into the nosepiece 131. The nosepiece 131 optionally can have a contact pad 810, such as for example a no mar contact pad, and that is configured to be placed on a workpiece, at a distal end of the nosepiece 131.

In an embodiment, movement of the lower contact arm 126 by contact with a workpiece can also move the upper contact arm 124 and position a contact pin 870 (FIG. 9) in a triggering position in a actuated position such that when a trigger 252 is actuated the trigger can cause a fastener to be driven. In an embodiment, if the contact pin 870 is not in an actuated position, the pneumatic fastener 1 will be prevented from driving a fastener into a workpiece.

FIGS. 1 and 2 also show a depth adjust mechanism 127 which optionally can be adjusted by a thumb wheel 125. The thumb wheel 125 can be adjust by an operator to drive a depth adjust cam that that can set a fastener drive depth.

As shown in FIGS. 2 and 3, the handle 585 can have a compressed air connector 300. A compressed air supply (not shown) can be attached to the compressed air connector 300 to provide compressed air 444 to actuate operations of the pneumatic fastening tool 1. The compressed air connector 300 can be a compressed air feed inlet to supply compressed air 444 to a pressure reservoir chamber 144. In an embodiment, the handle 585 can also have an outlet port 595 for exhaust air. In an embodiment, the pressure reservoir chamber 144 of the handle 585 can feed compressed air 444 to the over-piston chamber 390. Compressed air 444 can flow from the over-piston chamber 390 to the drive assembly 198 and/or the feed piston pressure tube 420.

FIG. 3 also shows various chambers for controlling the compressed air 444, the plenum air 333 which can flow through the plenum chamber 147 and exhaust air 555, resulting for example from driving fasteners, and which can be exhausted from the pneumatic fastening tool the outlet port 595 of handle 585 and/or through housing exhaust chamber 610 and/or other exhaust passage or port. The actuation of the drive assembly 198 can be driven by the flow of compressed air 444. In an embodiment, the drive assembly 198 can a driver piston 109 which can which can bear a driver blade 199.

The flow of compressed air 444 can be controlled in a resting state by feeding the compressed air 444 to pressurize a pressure reservoir chamber 144. As shown in FIG. 3, the pressure reservoir chamber 144 includes a portion of the handle 585 volume as well as the volume between the reservoir bulkhead 114 which can separate the pressure reservoir chamber 144 from the over-piston chamber 390. The plenum bulkhead 120 can separate the pressure reservoir chamber 144 from the plenum chamber 147 and which can surround a portion of the driver cylinder 119.

Figure 7:
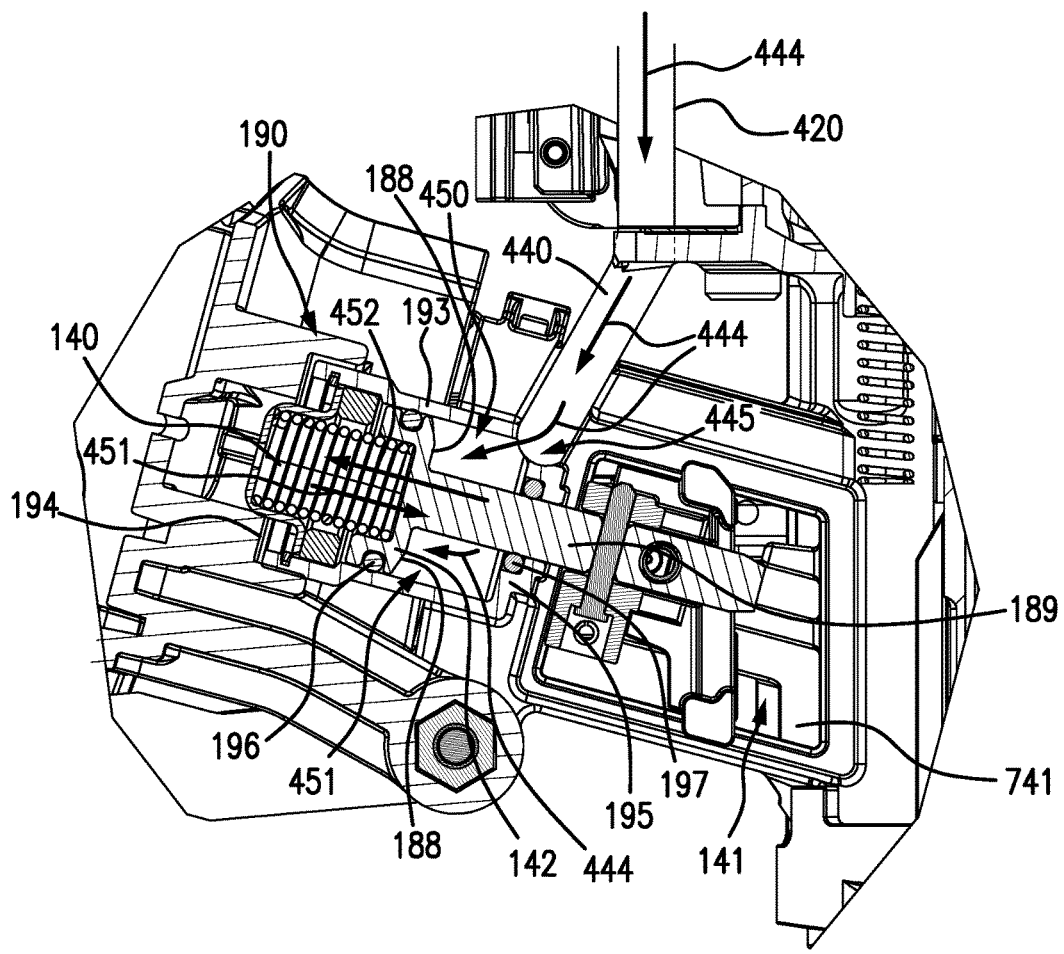
FIG. 7 is a detail sectional view of the feed piston assembly in an actuated state.

The "compressed air 444" in additional to its ordinary and customary meaning is defined herein as air having a pressure of 50 psig or greater which can actuate the drive assembly 198 and/or to actuate the head valve assembly 500 of the integrated valve assembly 600 and/or actuate the movement of feed piston 142. In an embodiment, the compressed air 444 can have a pressure in a range of 50 psig to 300 psig, or 70 psig to 220 psig, or 70 psig to 180 psig. In an embodiment, the compressed air can have a pressure in a range of 70 psig to 120 psig. Compressed air 444 can drive the drive piston 109 and can also be fed through the pressure tube inlet 412 to the feed piston pressure tube 420 to actuate the movement of the feed piston 142 and/or pressurize the feed piston return chamber 450 (FIG. 7).

"Plenum air 333" is the air controlled in the plenum chamber 147 and/or within the driver cylinder 119 between the driver piston 109 and the nose end of the driver cylinder 119. "Plenum air 333", is not within the definition of "compressed air 444" herein.

"Exhaust air 555" is air which is exhausted from the pneumatic fastening tool, such as "exhaust air 555" which can exit through the outlet port 595 of handle 585 and/or through housing exhaust chamber 610 (FIG. 8) and/or other exhaust passage or port. "Exhaust air 555" is not within the definition of "compressed air 444" herein.

Figure 9:
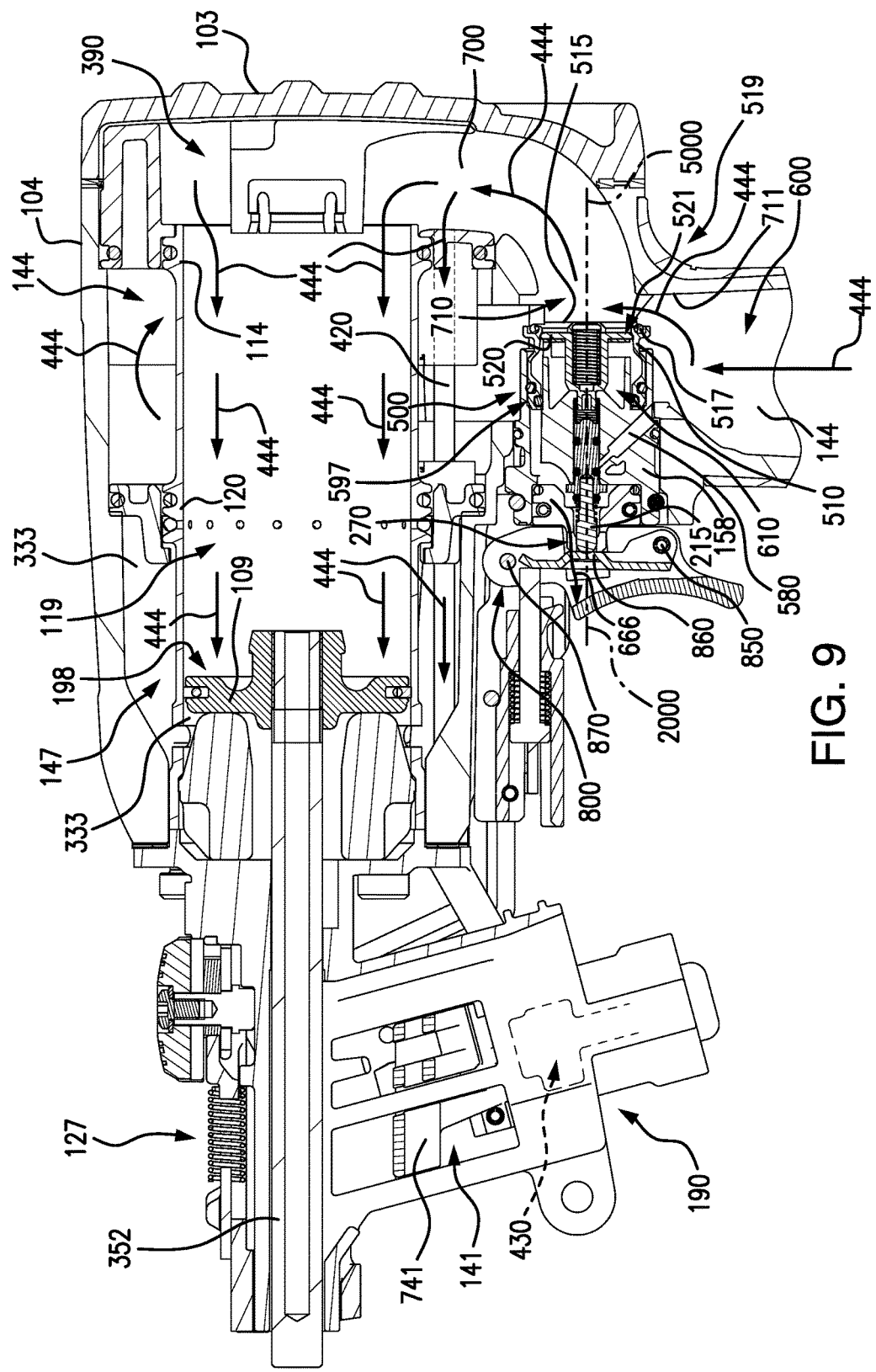
FIG. 9 is a sectional view showing the integrated valve assembly in an actuated state in which compressed air is fed to the feed piston assembly via the feed piston pressure tube.

FIG. 3 is a sectional view of the pneumatic fastening tool 1. In an embodiment, the pressure reservoir chamber 144 can contain compressed air 444. In an embodiment, the over-piston chamber 390 can be configured between the cap 103 and the driver 109 which, when actuated, drives the driver blade 199. The driver blade 199 can be coaxial disposed within the drive cylinder 119 to drive a fastener fed to the drive channel 352 into a workpiece. The over-piston chamber 390 can be a pressure chamber configured as a source to provide a compressed air from a reservoir to one or more features of the pneumatic fastening tool, such as the driver 109 and/or the feed piston return chamber 450 (FIGS. 6 and 7), or other feature. When the pneumatic fastening tool 1 is actuated to drive a fastener, the compressed air 444 can flow through the compressed air inlet port 710 to the over-piston chamber 390 which as shown in FIG. 9 can drive the driver 109 and feed compressed air 444 to a feed piston pressure tube 420.

In an embodiment, the pressure reservoir chamber 144 can have a portion which contains compressed air 444 in the handle 585. When the pneumatic fastening tool 1 is in the actuated state, compressed air 444 can be fed from the pressure reservoir chamber 144, to the over-piston chamber 390 and the feed piston return chamber 450.

FIG. 3 shows the pressure reservoir chamber 144, over-piston chamber 390 and plenum chamber 147 in a resting and/or exhausting state. When the drive piston 109 is actuated, the plenum chamber 147 receives the air the drive piston 109 pushes out from the driver cylinder 119. In an embodiment, the resting state for the pressure reservoir chamber 144, over-piston chamber 390 and plenum chamber 147 is achieved when the air within these chambers is exhausted over an exhaust time period. In an embodiment, when the head valve assembly 500, which is used to control the flow of compressed air 444 to at least the drive assembly 198 and feed piston pressure tube 420, achieves its resting state sealed with the handle reservoir surface 711 (FIG. 8) of handle 585, exhaust air 555 can exit through an integrated valve assembly 600. The integrated valve assembly 600 can have a cylindrical shape and control driving and exhaust air flows. In an embodiment, the use of feed piston pressure tube 420 to control the position of the feed piston 142 when driving a fastener and the integrated valve assembly 600 can achieve a number of design and operation advantages such as, but not limited to a high drive cycle speeds, a weight of 5.5 lbs or less with ergonomic balance in the hand of an operator during use and low recoil characteristics resulting from component location, weight distribution, as well as the configuration moving masses.

In an embodiment, the compressed air 444 can have a pressure in a range of 50 psig to 500 psig, or 70 psig to 220 psig, or 70 psig to 180 psig. In an embodiment, the compressed air can have a pressure in a range of 80 psig to 120 psig. Compressed air 444 can drive the drive piston 109 and can also be fed to the feed piston pressure tube 420 to actuate the movement of the feed piston 142 and/or pressurize the feed piston return chamber 450 which houses the feed piston 142.

A compressed air supply (not shown) can be attached to the compressed air connector 300 to provide a compressed air 444 to handle reservoir chamber 587. In an embodiment, the handle 585 can also have an outlet port for exhaust air. In an embodiment, the handle reservoir chamber 587 of the handle 585 can feed compressed air 444 to the over-piston chamber 390 chamber and the integrated valve assembly 600.

FIG. 3 also shows the feed piston pressure tube 420 which passes through a reservoir bulkhead 114 and a plenum bulkhead 120. FIG. 3 also shows a feed piston assembly 190 that that can drive and/or control the feeding of a fastener into a drive channel 352. In an embodiment, the feed piston assembly 190 includes the feed piston 142, a feed piston nose stop 143 and a feed spring 140 which is biased to impart a force upon the feed piston toward the feed piston nose stop 143.

The trigger 252 can be actuated to trigger the drive piston 109 to drive a fastener. Upon actuation of the trigger 252, pneumatic pressure can cause the drive piston 109 to drive the driver blade 199 to drive a fastener into a workpiece. The housing 104 can have a portion which forms a cap 103 that covers the over-piston chamber 390.

In an embodiment, the trigger 252 can optionally be configured such that both a contact pin 870 and a trigger pin 850 have to be in an actuated configuration in order to trigger the trigger valve assembly 200. The contact pin 870 and the trigger pin 850 can together, or optionally separately, can trigger and/or actuate the trigger valve assembly 200 of the integrated valve assembly 600. Optionally, a trigger actuator 860 can be used to contact the trigger valve assembly 200 to actuate the trigger valve assembly 200 of the integrated valve assembly 600. As shown in FIG. 3, the trigger actuator 860 requires that the trigger pin 850 and the trigger 252 both be in an actuating position for the trigger actuator 860 to compress the trigger spring 251 and move a proximal trigger stem 215 to actuate the trigger valve assembly 200.

In the embodiment shown in FIGS. 1-3, in order for the trigger valve assembly 200 to be actuated, the trigger pin 850, the contact pin 870 and the trigger 252 must be in an actuated configuration at the same time. Optionally, the position of the contact pin 870 can at least in part be determined by the position of the upper contact arm 124. Specifically, the movement of the lower contact arm 126 resulting from contact with a workpiece can move the upper contact arm 124 to position a contact pin 870 in a triggering position. The contact pad 810 can directly, or by an intermediate linkage, move the upper contact arm 124 which can move trigger pin 850 to a configuration to allow for triggering of the trigger valve assembly 200 upon a simultaneous actuation of the trigger 252 by an operator. In the example of FIG. 3, the trigger actuator 860 requires that the trigger pin 850 and the trigger 252 both be in an actuating position for the trigger actuator 860 to compress the trigger spring 251 and move the proximal trigger stem 215 to actuate the trigger valve assembly 200.

Figure 4:
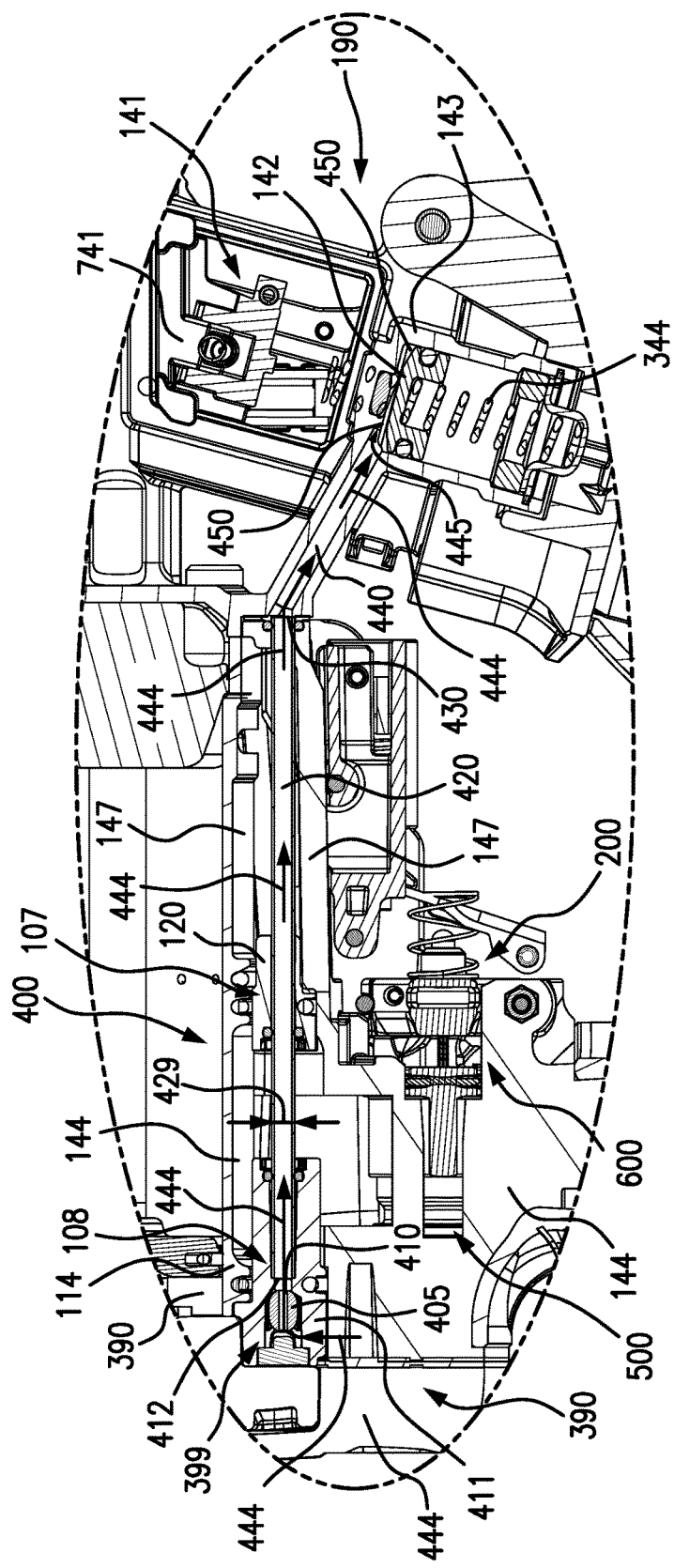
FIG. 4 is a detail sectional view showing the feed piston pressure tube.

In an embodiment, a feed tube assembly 400 can feed compressed air 444 to the feed piston pressure tube 420 and/or the feed piston return chamber 450. FIG. 4 is a detail sectional view showing a feed tube assembly 400 which can have the feed piston pressure tube 420 extending from a feed tube nozzle 405 through a feed tube opening 410 to a nose channel inlet 440 which feeds the feed piston return chamber 450 through a nose port 445.

FIG. 4 shows the feed piston pressure tube 420 which provides a passageway for flow of the compressed air 444 from a compressed air source to the feed piston 142 thereby forcing the feed piston 142 to momentarily move in a direction away from the drive channel 352. The temporary movement of the feed piston 142 facilitates a successful driving of a fastener 556 to be driven and a successful feed of a next fastener 557 to be driven upon the following movement of the feed piston 142 back toward the drive channel 352. In an embodiment, the fasteners 556, 557 can be fed from a fastener coil 558 or a stick of fasteners.

FIG. 4 also shows the flow of compressed air 444 entering pressure tube inlet 412 flowing through the feed piston pressure tube 420 to pass through a feed tube outlet 430 to then flow through the nose channel 440 into the feed piston return chamber 450. In an embodiment, the flow of compressed air 444 through the feed piston pressure tube 420 can exit directly into the feed piston return chamber 450. The compressed air 444 can be fed to the feed piston pressure tube 420 from the handle reservoir chamber 587 and/or the over-piston chamber 390 and/or pressure reservoir chamber 144, or other source.

In an embodiment, the feed piston pressure tube 420 can have an inner diameter 429 in a range of 1 mm to 20 mm, or greater, such as 3 mm, 5 mm or 10 mm. In an embodiment, the feed piston pressure tube 420 can have a length of from 25 mm to 250 mm, such as 115 mm. Optionally, the feed piston pressure tube 420 can comprise multiple tubes forming a passageway for compressed air 444 each of which has a length in a range of 2 mm to 250 mm.

In the embodiment of FIG. 4, the feed piston pressure tube 420 is configured to pass through a reservoir bulkhead opening 108 in the reservoir bulkhead 114 and through a plenum bulkhead opening 107 in the plenum bulkhead 120. FIG. 4 shows the feed piston pressure tube 420 passing through a reservoir bulkhead 114 of pressure reservoir chamber 144 and a plenum bulkhead 120 of plenum chamber 147 to reach the nose channel 440 feeding the feed piston return chamber 450. Optionally, the reservoir bulkhead 114 and/or the plenum bulkhead 120 can have nozzles and passages to which segments of the feed piston tube can connect thus forming a multi-segmented channel though which compressed air 444 can flow from a source to the feed piston 142 and/or the feed piston return chamber 450 and/or the nose channel 440.

In its several and varied embodiments, compressed air 444 can be fed to provide a force upon the feed piston 142 to move the feed piston 142 away from the drive channel 352 when the trigger valve assembly 200 of the integrated valve assembly 600 is actuated by an operator and/or when the head valve assembly 500 is actuated by an operator.

When the trigger valve assembly 200 and the head valve assembly 500 achieve an active state (FIG. 9), the compressed air 444 can be fed to the drive assembly 198 and the driver blade 199 can drive a fastener to be driven 556 (FIG.

8) through the drive channel 352 into a workpiece. Then, the feed piston pressure tube 420 can provide the compressed air 444 to retract a feed piston 142 and feed pawl 141.

While the example of FIG. 4 shows a feed piston pressure tube 420, this disclosure is not limited in the types of members by which compressed air 444 can be provided to retract the feed piston 142 and the feed pawl 141. In a non-limiting example, one or more of the following can be used to provide compressed air 444 to the feed piston 142 and/or the feed piston return chamber 450: a passageway, a channel, a pipe, a tubular member, a feed piston pressure tube 420, a valve, or an opening.

In an embodiment, creating a momentary delay between the time that the compressed air 444 first begins to move the drive piston 109 and the moment that compressed air 444 begins to retract the feed piston 142 and the feed pawl 141, can provide a benefit in coordinating the striking of the fastener to be driven 556 by the driver blade 199 and the movement of the feed pawl 141 away from the driver being struck. Thus, the driver blade 199 can strike a fastener to be driven 556 which is free of contact from the feed pawl 141 at the moment of being driven. This momentary delay can be achieved by placing a member that causes such delay in the flowpath of the compressed air 444 to the feed piston 142 and/or feed piston return chamber 450, such as an orifice, flow restriction member, pressure let-down member, valve, or other member or configuration for achieving such a momentary delay in the initial flow of compressed air 444 to the feed piston 142 and/or feed piston return chamber 450.

In the example of FIG. 4, an orifice bead 405, which is a type of orifice member, is used to create a momentary delay between the time that the compressed air 444 first begins to move the piston 109 and the moment that compressed air 444 begins to retract the feed piston 142 and the feed pawl 141. FIG. 4 shows the orifice bead 405 housed at least in part in an orifice chamber 399. The orifice bead 405 can receive compressed air 444 through an air feed gap 411 and provide a pressure drop to the compressed air 444 fed to the feed tube opening 410.

FIG. 4 also shows a feed piston assembly 190 which is fed compressed air through the nose port 445 to the feed piston return chamber 450. The force of the compressed air against the feed piston 142 can overcome the bias of feed piston spring 344 toward the feed piston nose stop 143 to move the feed piston 142 away from the feed piston nose stop 143.

In an embodiment, the feed pawl 141 can have a feed pawl shaft 189 (FIGS. 6 and 7) and a feed pawl head 741. When the feed piston 142 is in a resting state, the feed pawl 141 is biased to contact one or more of the fasteners and to push the one or more fasteners toward the drive channel 352. The feed pawl 141 can be configured to move in concert with the movement of the feed piston 142.

Figure 5A:
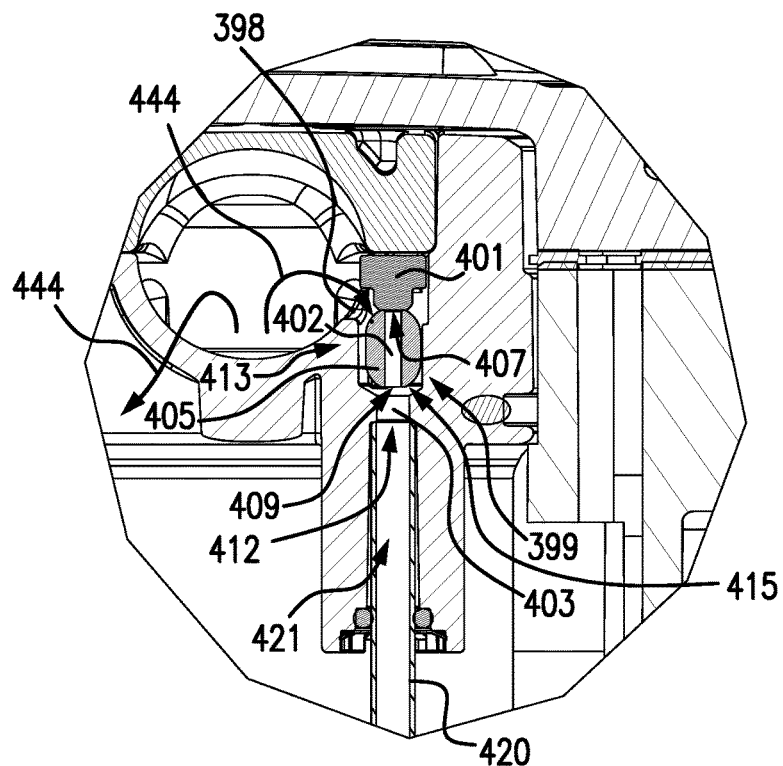
FIG. 5A shows a restriction valve assembly in the connecting tube flow path.

FIG. 5A is a detail view of the orifice chamber 399. In the embodiment shown, the combination of the orifice chamber 399 and orifice bead 405 achieve restriction to the flow of compressed air 444, which is referred to herein as a flow restriction assembly 413. In a non-limiting example a flow restriction assembly 413 can be an orifice valve, a restriction plate, a let-down valve, a valve, a porous member, or other member.

FIG. 5A shows a pressure drop member which can be a flow restriction assembly 413. The flow restriction assembly 413 can receive the flow of compressed air 444 during a resting state or at the end of an exhaust cycle. The flow restriction assembly 413 can be in the feed piston pressure tube flow path 421 of the feed piston pressure tube 420. FIG. 5A shows the flow restriction assembly 413 in at the moment compressed air 444 flow of compressed air 444 flows to an orifice chamber inlet 398 to a flow restriction assembly 413.

The orifice bead 405 can have an orifice inlet 407 and an orifice outlet 409. The orifice bead 405 can be housed in an orifice chamber 399. Optionally, a bead stop 401 can be used to limit the movement of the orifice bead 405 and maintain the orifice bead 405 in the orifice chamber 399. In an embodiment, the movement of the orifice bead can be limited between the bead stop 401 and the orifice chamber outlet 403.

In the resting state or during the exhaust cycle, optionally as shown in FIG. 5A, the orifice bead 405 can be separated from the pressure tube inlet 412 which can provide a rest gap 415.

FIG. 5A shows the moment the compressed air 444 contacts the orifice bead 405. The contact of the compressed air 444 can exert pressure upon the orifice bead 405 which can move the orifice bead 405 toward the orifice chamber outlet 403. In a state in which the pneumatic fastening tool 1 is fully exhausted the orifice bead 405 can move within the orifice chamber 399 freely in accordance with gravitational forces on the orifice bead 405.

Once the orifice bead 405 reaches the orifice chamber outlet 403 and compressed air 444 flows through an orifice channel 402 and into a feed piston pressure tube flow path 421, the flow restriction assembly 413 has reached its actuated state.

In an embodiment, the compressed air 444 entering the orifice chamber inlet 398 can flow through an orifice channel 402 and into a feed piston pressure tube flow path 421, as well also flow around the orifice bead 405 and directly enter the feed piston pressure tube flow path 421.

Figure 5B:
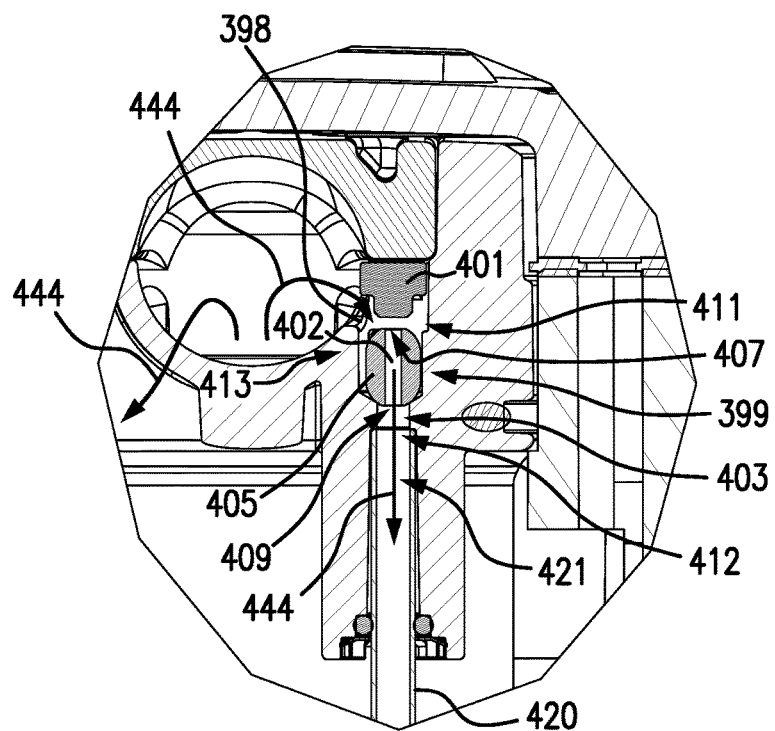
FIG. 5B shows a restriction valve assembly in the connecting tube flow path in its actuated state.

FIG. 5B shows a flow restriction assembly 413 in an actuated state. In the actuated state, the orifice bead 405 can be configured adjacent to the orifice chamber outlet 403. In the actuated state, the flow of compressed air 444 can flow through the air feed gap 411 and into an orifice inlet 407 thought the orifice channel 402 out of the orifice outlet 409 out of the orifice chamber outlet 403 and into the feed piston pressure tube flow path 421 of feed piston pressure tube 420.

The pressure drop member, such as the orifice bead 405, can achieve a pressure drop in the compressed air flow across the pressure drop member. The pressure drop can cause a slight delay between when the compressed air 444 first causes the movement of the drive piston 109 to drive a fastener and when the compressed air 444 later causes the movement of the feed piston 142 away from a feed piston housing pawl end 195. The striking a the fastener to be driven 556 by the driver blade 199 can be coordinated with the retraction of the feed piston 142 away from a feed piston housing pawl end 195. Timing the movement of the feed piston 142 away from a feed piston housing pawl end 195 to occur slightly after the drive piston 109 is actuated can synchronize the striking of the fastener to be driven 556 by the driver blade 199 and the movement of the feed piston 142 and feed pawl 141 away from the fastener to be driven 556 so as to reduce and/or eliminate the likelihood of a misfire. In an embodiment, the timing of actuation of the movement of the feed piston 142 can be set by use of a flow restriction assembly 413 and/or orifice member, such as orifice bead 405, to maximize the period in which the feed pawl 141 contacts a fastener, but still withdraws the feed pawl 141 in sufficient time not to interfere with the contact of the driver blade 199 by the drive piston 109 to a fastener to be driven 556.

The FIG. 5B example uses an orifice bead 405 to achieve a pressure drop, ΔPorifice, between the orifice bead inlet 407 and orifice bead outlet 409. The compressed air 444 exiting the orifice bead outlet 409 has a pressure which is less than the pressure of compressed air source minus APorifice, or less. In the case of the embodiment of FIG. 5B, the orifice bead outlet 409 pressure can be the pressure of the reservoir chamber 144 and/or the handle minus APorifice, or less.

In an embodiment, exhaust air from the feed piston return chamber 450 can flow through an orifice channel 402 and into a feed piston pressure tube flow path 421, as well also flow around the orifice bead 405. Lower pressure exhaust air from the feed piston return chamber 450 can at least in part bypass flowing through the orifice bead 405.

Figure 6:
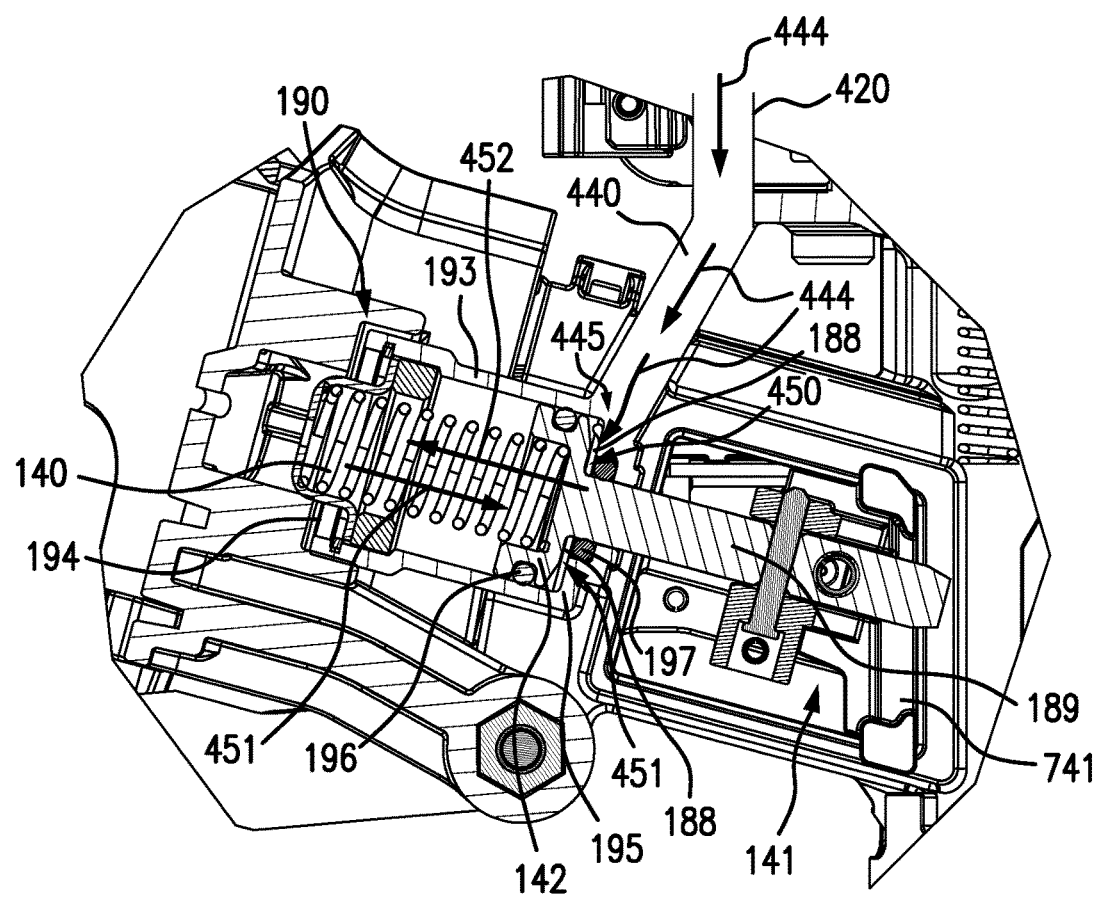
FIG. 6 is a detail sectional view of the feed piston assembly in a resting state.

FIG. 6 shows a detail sectional view of the feed piston assembly 190 in a resting state. The feed piston assembly 190 can have a feed piston housing 193, a feed piston 142, a feed piston spring 140, a feed piston housing base end 194 and a feed piston housing pawl end 195. The feed piston spring 140 biases the feed piston 142 toward the feed piston housing pawl end 195. The feed piston 142 can be sealed against the feed piston housing 193 by a feed piston seal 196 and the feed pawl shaft 189 can be sealed against the feed piston housing 193 by piston housing seal 197.

FIG. 6 shows the feed piston return chamber 450. The feed piston return volume 451 of the feed piston return chamber 450 is dependent upon the position of the feed piston 142. The feed piston return volume 451 can range from zero if the feed piston pawl face 188 is flush against the feed piston housing pawl end 195 and the compressed air inlet port is through the feed piston housing pawl end 195, to an actuated volume between the feed piston pawl face 188 and the feed piston housing pawl end 195 when the feed piston 142 is in its actuated state (FIG. 7).

FIG. 6 shows the feed piston 142 in a resting state in which the feed piston pawl face 188 is a minimum distance from the feed piston housing pawl end 195. A flow of compressed air 444 is shown to the feed piston return chamber 450 to begin actuating movement of the feed piston 142 away from the feed piston housing pawl end 195. At the moment shown in FIG. 6, The flow of compressed air 444 is shown through feed piston pressure tube 420 into the nose channel inlet 440 out of a nose port 445 and into the feed piston return chamber 450 exerting a feed piston return force 452 against the feed piston 142 and counter to the feed piston spring bias 451.

When the feed piston return force 452 exceeds the feed piston spring bias 451 and other frictional forces, such as the frictional force created by feed piston seal 196, then the feed piston 142 starts to move away from the feed piston housing pawl end 195.

FIG. 7 is a detailed sectional view of the feed piston assembly 190 in an actuated position in which the feed piston 142 is at a maximum distance from the feed piston housing pawl end 195. At the moment shown in FIG. 7, the feed piston return chamber 450 has the feed piston return volume 451 which is at a maximum volume. In the fully actuated state shown in FIG. 7, the feed pawl has been moved by the feed piston 142 to its maximum distance from the drive channel 352 of the feed piston assembly 190.

When the flow of compressed air 444 ceases, then the feed piston spring bias 451 can overcome the feed piston return force 452, which is diminishing, and other forces, as the air pressure within the feed piston return chamber 450 decreases. When the feed piston spring bias 451 overcomes the piston return force 452 and other forces, then the spring will push the feed piston 142 toward the feed piston housing pawl end 195, thus returning the feed piston 142 to the resting position of feed piston 142 and returning the feed piston assembly 190 to a resting state.

Figure 8:
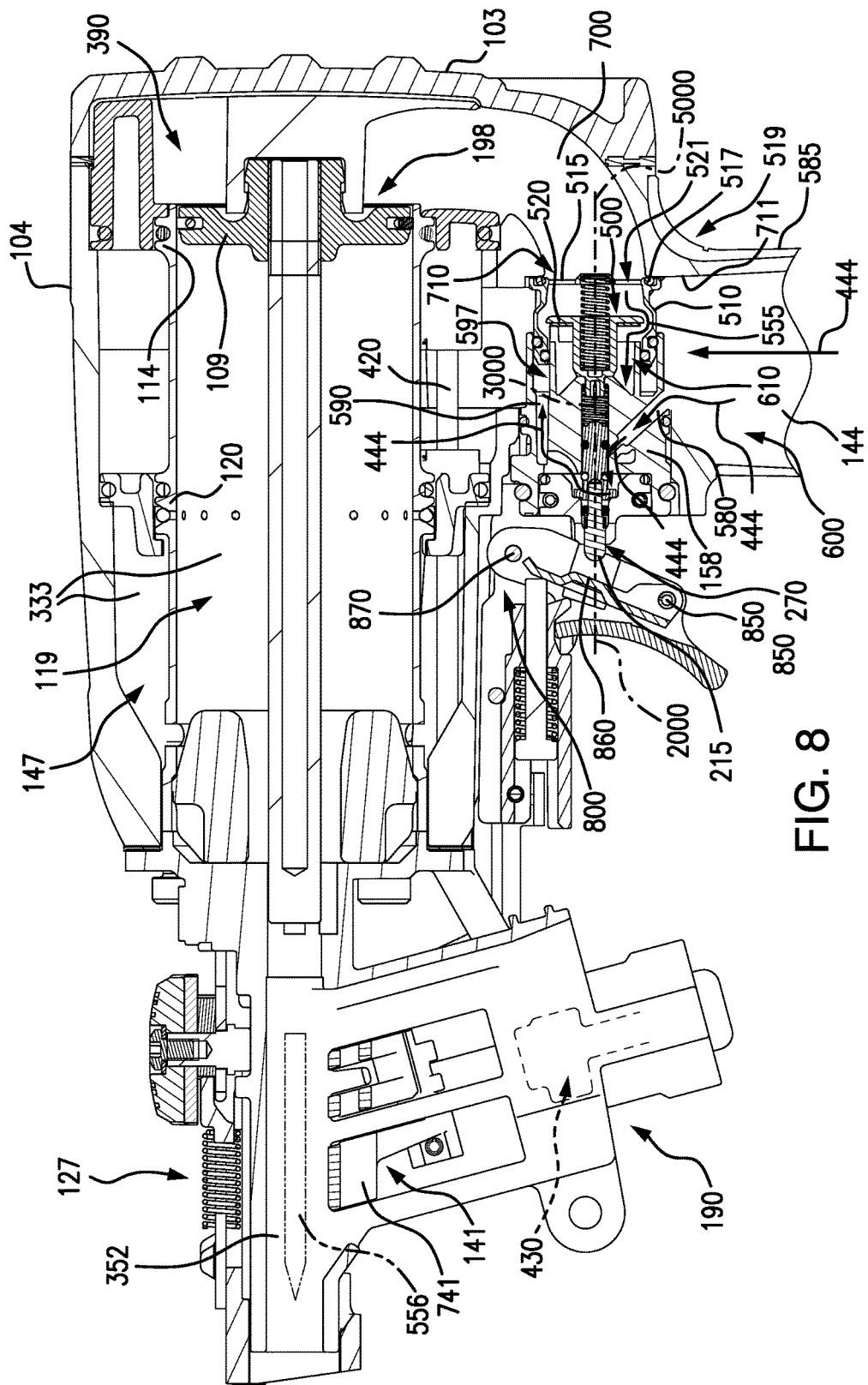
FIG. 8 is a sectional view showing the integrated valve assembly in a resting state in which no compressed air is fed to the feed piston assembly.

FIG. 8 is a sectional view showing the integrated valve assembly 600 in a resting state blocking the flow of compressed air 444. In an embodiment, the head valve assembly 500 can use a seal member to form a seal between the head valve body 510 and a portion of the pressure reservoir chamber 144 so as to stop the flow of the compressed gas 444 into the compressed air inlet port 710. FIG. 8 shows the head valve seal member 517 creating a seal with the handle reservoir surface 711 and blocking the compressed air inlet port 710 from receiving the flow of compressed air 444. In an embodiment, the head valve housing 510 can have a head valve seal member 517, which can optionally be an O-ring. In an embodiment, the head valve seal member 517 can press against the handle reservoir surface 711 forming a seal which achieves the resting state of the head valve assembly 500 and in conjunction with the head valve body 510 blocks the flow of compressed air 444 from reaching the compressed air inlet port 710 when the head valve assembly 600 is in the resting state. As shown in FIG. 8 at a resting state the head valve 515 can be at a distance from exhaust seal 520. In an embodiment, the exhaust seal 520 can be made of a plastic or polymer, such as urethane to engage sealingly with the head valve body 510 and/or head valve 515. The head valve body 510 and/or head valve 515 can be made from a plastic, metal, composition, or other material, such as plastic or brass.

FIG. 8 also shows the flow of compressed air 444 into the head valve line 590 and pressurizing the annulus chamber 597 to achieve and/or maintain the head valve assembly 500 in the resting state. In the head valve assembly 500 resting state, the drive assembly 198 and the feed piston assembly 190 are also in a resting state. In the resting state, the drive cylinder 119, a snorkel air passage 700, plenum chamber 147, over-piston chamber 390, feed piston return chamber 450 and housing exhaust chamber 610 are each depressurizing and/or unpressurized to, or close to, ambient pressure, or about 0 psig, and are free of the compressed air 444.

In an embodiment, snorkel air passage 700 can be a conduit having a portion which can be curved. The curved portion of the snorkel air passage 700 can optionally and in nonlimiting example have a curved shape analogous to a portion of a snorkel.

In this configuration, compressed air 444 from the handle reservoir chamber 587, or other source, such as the pressure reservoir chamber 144, can be fed through the reservoir line 580 to pass through a head valve line 580 to pressurize the annulus chamber 597 and move and maintain the head valve assembly 500 in its resting state.

In the resting state, the proximal trigger stem 215 is biased by trigger spring 251 to press against and close the stem exhaust port 270 of trigger valve assembly 200.

In the resting state, the head valve housing 510 is configure to seal a compressed air inlet port 710 preventing a flow of compressed air 444 through the snorkel passage 700 to the over-piston chamber 390.

FIG. 9 is a sectional view showing the integrated valve assembly 600 in an actuated state. In the actuated state, the annulus chamber 597 is purged of air and resulting pressure differential across the head valve 515 and head valve body 510 and the pressure from the compressed air 444 causes the head valve assembly 500 to reach an actuated state. When the head valve assembly 500 is in the actuated state, the flow of compressed air 444 to each of the snorkel air passage 700, the over-piston chamber 390, drive assembly and drive cylinder 119 and the feed piston return chamber 450. In an actuated state, if both the contact pin 870 and trigger pin 850 are each in an actuated configuration, the trigger actuator 860 can actuate the integrated valve assembly 600 and trigger the driving of a fastener into a workpiece.

In an actuated state, the head valve 515 is pressed against the exhaust seal 520 which obstructs the flow of compressed air through exhaust openings 521 and achieves the actuated state of the head valve assembly 500.

In an embodiment, a drive cycle speed of a pneumatic fastening tool which can be a function of the trigger and head valve operation, piston return and feed system characteristics, compressed air supply and exhaustion.

The feed piston pressure tube 420 alone, or in combination with the integrated valve assembly 600, supports the high drive cycle speed which achieves a drive frequency, of drives of the driver assembly 198, of 0 to 25 drives per second, which can also can be characterized as 0 to 25 fasteners driven per second. In an embodiment the pneumatic fastening tool can achieve a drive cycle speed of 14 to 25 drives per second, or of 14 to 25 drives fasteners driven per second. In another embodiment the pneumatic fastening tool can achieve a drive cycle speed of 5 to 15 drives per second, or fasteners of 5 to 15 driven per second. In another embodiment the pneumatic fastening tool can achieve a drive cycle speed of 6 to 12 drives per second, or of 6 to 12 fasteners driven per second. The use of the feed piston pressure tube 420 alone, or in combination with the integrated valve assembly 600, achieves a rapid drive cycle speed at which the nailer can be fired without a firing pause or delay caused by factors associated with the tool returning to a rest or pre-actuated state, such as exhausting air or mechanical transition from actuated to a resting and/or pre-firing state.

Each the feed piston pressure tube 420 and the integrated valve assembly 600 use separately achieved increased drive cycle speed of a pneumatic fastening tool 1. The use of the feed piston pressure tube 420 increased the drive cycle speed which can be achieved by reducing and/or freeing the fastener to be driven 556 from the physical forces of the feed pawl 141 when the feed piston assembly 190 is in a actuated state and the feed pawl 141 is not in contact with a fastener. In an embodiment, the use of the feed piston pressure tube 420 to actuate the feed piston assembly 190 when the compressed gas pressure is in a range of 70 psig to 150 psig, or 70 to 120 psig achieves high drive cycle speeds with reduced misfire events. The feed piston pressure tube 420 achieve a particular advantage in increased drive cycle speeds at less than 100 psig, or less than 80 psig, or even less than 70 psig. Thus, when the pneumatic fastening tool 1 is being fired at a fast rate and the compressed air 444 pressure in the pressure reservoir chamber is declining as a result of use, the pneumatic fastening tool 1 using feed piston pressure tube 420 can nonetheless achieve high drive cycle speeds. In an embodiment, use of the feed piston pressure tube 420 can achieve drive cycle speeds of 0 to 15, or 6 to 18, such as 12, 14 or 15, drives per second, or fasteners driven per second In another aspect, the integrated valve assembly 600 achieves a fast and efficient valve motion. The integrated valve assembly 600 can alone achieve high drive cycle speeds. When the integrated valve assembly 600 is used in conjunction with the feed piston pressure tube 420 which can actuate the feed piston assembly 190 and very high drive cycle speeds are achieved, such as in a range of from 6 to 20 drives per second, or fasteners driven per second.

In an embodiment, the drive cycle speed of a pneumatic fastening tool 1 using compressed air 444 of 100 psig and a feed piston pressure tube 420 can achieve a drive cycle speed of 0 to 15, such as 12, 14 or 15, drives per second, or fasteners driven per second. In an embodiment, the pneumatic fastening tool 1 can have an integrated valve assembly 600, a compressed air 444 having a pressure of 70 psig or greater, a drive cycle speed of 10 drives per second and a weight of 6 lbs or less, such as 5.5 lbs or less, or 5 lbs or less. In another example, the pneumatic fastening tool 1 having fasteners fed from a fasteners coil 558 can achieve the drive cycle speed of greater than 5 drives per second, or fasteners driven per second. In yet another example, the pneumatic fastening tool 1 having fasteners fed from a fasteners coil 558 can achieve the drive cycle speed in a range of 6 to 15, drives per second, or fasteners driven per second such as 12, 14 or 15 drives per second, or fasteners driven per second.

Numeric values and ranges herein, unless otherwise stated, also are intended to have associated with them a tolerance and to account for variances of design and manufacturing. Thus, a number can include values "about" that number. For example, a value X is also intended to be understood as "about X". Likewise, a range of Y-Z, is also intended to be understood as within a range of from "about Y-about Z". Unless otherwise stated, significant digits disclosed for a number are not intended to make the number an exact limiting value. Variance and tolerance is inherent in mechanical design and the numbers disclosed herein are intended to be construed to allow for such factors (in non-limiting e.g., ±10 percent of a given value). Likewise, the claims are to be broadly construed in their recitations of numbers and ranges.

Additionally herein geometric references are intended also to be construed to account for variance, for example the term "circular" is intended to encompass "substantially circular", "generally circular", or other reasonable variations in the context of the embodiments disclosed herein. Likewise the term "cylindrical" is intended to encompass "substantially cylindrical", "generally cylindrical", or other reasonable variations in the context of the embodiments disclosed herein.

This disclosure regards a pneumatic fastening tool and its many aspects, features and elements. Such an apparatus can be dynamic in its use and operation. This disclosure is intended to encompass the equivalents, means, systems and methods of the use of the pneumatic fastening tool and its many aspects consistent with the description and spirit of the apparatus, means, methods, functions and operations disclosed herein. Other embodiments and modifications will be recognized by one of ordinary skill in the art as being enabled by and within the scope of this disclosure.

The scope of this disclosure is to be broadly construed. The embodiments herein can be used together, separately, mixed or combined. It is intended that this disclosure disclose equivalents, means, systems and methods to achieve the devices, designs, operations, control systems, controls, activities, mechanical actions, dynamics and results disclosed herein. For each mechanical element or mechanism disclosed, it is intended that this disclosure also encompasses within the scope of its disclosure and teaches equivalents, means, systems and methods for practicing the many aspects, mechanisms and devices disclosed herein. The claims of this application are likewise to be broadly construed.

The description of the technology herein in its many and varied embodiments is merely exemplary in nature and, thus, variations that do not depart from the gist of the disclosure are intended to be within the scope of the claims and the disclosure herein. Such variations are not to be regarded as a departure from the spirit and scope of the disclosed technologies.

It will be appreciated that various modifications and changes can be made to the above described embodiments of the power tool as disclosed herein without departing from the spirit and the scope of the claims.

We claim:

1. A pneumatic fastening device, comprising:
a trigger which when actuated changes a state of the pneumatic fastening device from a resting state to an actuated state:
a driver piston configured at least in part within a driver cylinder;
a driver blade driven by said driver piston to drive a fastener into a workpiece;
a nosepiece having a drive channel;
a feed piston return chamber housing a feed piston;
a compressed air feed inlet through which a compressed air is fed to a pressure reservoir chamber which receives the compressed air; and
a valve that selectively feeds the compressed air to the driver piston to drive the driver blade when the trigger is actuated to achieve the actuated state;
wherein the feed piston return chamber is free of a feed of the compressed air when the pneumatic fastening device is in the resting state;
wherein when the trigger is actuated the feed piston return chamber is selectively fed the compressed air which moves the feed piston in a direction away from the drive channel; and
wherein, while the driver blade is driven by the compressed air, the feed piston return chamber is free of all air that has flowed through at least a portion of the driver cylinder.

2. The pneumatic fastening device according to claim 1, further comprising:
a feed pawl that moves in concert with a movement of the feed piston.

3. The pneumatic fastening device according to claim 1, further comprising a means by which the compressed air is fed to the feed piston return chamber.

4. The pneumatic fastening device of claim 3, wherein the means is a passageway.

5. The pneumatic fastening device of claim 3, wherein the means is a feed piston pressure tube.

6. The pneumatic fastening device of claim 3, wherein the means is configured to transport the compressed air through at least one bulkhead member to the feed piston return chamber.

7. The pneumatic fastening device of claim 1, wherein the fastener is a nail.

8. The pneumatic fastening device of claim 1, wherein the fastener is a staple.

9. The pneumatic fastening device according to claim 1, wherein the feed piston return chamber is free of a plenum air.

10. The pneumatic fastening device according to claim 1, wherein the feed piston return chamber is free of a feed from a housing exhaust chamber.

11. The pneumatic fastening device according to claim 1, wherein the feed piston return chamber is free of an exhaust air.

12. The pneumatic fastening device according to claim 1, further comprising:
an over-piston chamber,
wherein a feed piston pressure tube is configured to receive a portion of the compressed air from the over-piston chamber.

13. A pneumatic fastening device, comprising:
a compressed air feed inlet through which a compressed air is fed to a pressure reservoir chamber configured to contain the compressed air;
a driver piston at least in part surrounded by a driver cylinder;
a feed piston return chamber which houses a feed piston that drives a feed pawl that is free of any and all pivotal motion to control a feed of a plurality of nails; and
a valve that selectively feeds the compressed air to the driver piston and to a feed piston pressure tube that provides the compressed air to the feed piston return chamber,
wherein, while a driver blade is driven by the compressed air fed to the driver piston, the compressed air fed to the feed piston pressure tube is free of all air that has flowed through at least a portion of the driver cylinder.

14. The pneumatic fastening device according to claim 13, further comprising:
an orifice having an orifice inlet and an orifice outlet,
wherein the compressed air is fed to the orifice inlet, passes through the orifice, exits the orifice outlet and is fed to the feed piston pressure tube.

15. The pneumatic fastening device according to claim 13, further comprising:
an orifice bead having an orifice bead inlet, an orifice bead channel and an orifice bead outlet,
wherein the compressed air is fed to the orifice bead inlet, passes through the orifice bead channel, exits the orifice bead outlet and is fed to the feed piston pressure tube.

16. The pneumatic fastening device according to claim 13, wherein the feed piston pressure tube is configured to connect a feed inlet that receives the compressed air from the pressure reservoir chamber and a nose port of the feed piston return chamber.

17. The pneumatic fastening device according to claim 13, wherein the compressed air fed from the pressure reservoir chamber has a pressure in a range of 70 psig to 500 psig.

18. The pneumatic fastening device according to claim 13, further comprising:
at least one bulkhead configured between the pressure reservoir chamber and the feed piston,
wherein the feed piston pressure tube passes through the at least one bulkhead.

19. The pneumatic fastening device according to claim 13, further comprising:
an over-piston chamber configured to provide the compressed air to the feed piston pressure tube; and
a bulkhead through which the feed piston pressure tube passes,
wherein the bulkhead is configured between the over-piston chamber and the feed piston.

20. The pneumatic fastening device according to claim 13, further comprising:
a plenum chamber,
wherein the plenum chamber has a plenum bulkhead through which the feed piston pressure tube passes.

21. The pneumatic fastening device according to claim 13, further comprising:
a reservoir bulkhead configured between an over-piston chamber and the pressure reservoir chamber; and
a plenum bulkhead configured between the pressure reservoir chamber and a plenum chamber, wherein the feed piston pressure tube passes through the reservoir bulkhead and through the plenum bulkhead.

22. The pneumatic fastening device according to claim 13,
wherein the feed pawl is configured to contact at least one nail when in a resting state,
wherein the feed piston controls a movement of the feed pawl,
wherein the feed piston return chamber is disposed between the feed piston and a head of the feed pawl, and
wherein the feed piston pressure tube is configured to provide the compressed air to the feed piston return chamber.

23. The pneumatic fastening device according to claim 13,
wherein the feed piston return chamber has a nose port that is disposed between the pressure reservoir chamber and the feed piston, and
wherein the feed piston pressure tube is configured to provide the compressed air through a feed tube opening and into the feed piston return chamber through the nose port.

24. The pneumatic fastening device according to claim 13, further comprising:
a nose port that is disposed between the pressure reservoir chamber and the feed piston; and
a feed tube opening of the feed piston pressure tube which receives the compressed air and feeds the compressed air to the feed piston through the nose port;
wherein the feed piston is configured to drive the feed pawl which pushes at least one nail,
wherein the feed pawl is configured to contact the at least one nail when in a resting state, and
wherein the nose port is disposed between the feed piston and the feed pawl.

25. The pneumatic fastening device according to claim 13, wherein the feed piston pressure tube is fed the compressed air from the pressure reservoir chamber.

26. The pneumatic fastening device according to claim 13, further comprising:
a handle reservoir chamber,
wherein the handle reservoir chamber feeds the compressed air to the feed piston pressure tube.

27. The pneumatic fastening device according to claim 13, further comprising:
an over-piston chamber,
wherein the feed piston pressure tube is configured to receive a portion of the compressed air from the over-piston chamber.

* * * * *